(12) United States Patent
Kageura et al.

(10) Patent No.: US 11,573,092 B2
(45) Date of Patent: Feb. 7, 2023

(54) CONTROL SYSTEM AND CONTROL METHOD FOR HYBRID VEHICLE

(71) Applicant: TOYOTA JIDOSHA KABUSHIKI KAISHA, Aichi-ken (JP)

(72) Inventors: Yoshiyuki Kageura, Shizuoka-ken (JP); Daiki Yokoyama, Gotemba (JP); Kosuke Yamamoto, Gotemba (JP); Hideto Wakabayashi, Numazu (JP); Yoshifumi Hayashi, Susono (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 20 days.

(21) Appl. No.: 17/355,174

(22) Filed: Jun. 23, 2021

(65) Prior Publication Data
US 2021/0404825 A1    Dec. 30, 2021

(30) Foreign Application Priority Data

Jun. 25, 2020  (JP) .............................. JP2020-109889
Mar. 26, 2021  (JP) .............................. JP2021-053797

(51) Int. Cl.
*G01C 21/34* (2006.01)
*B60W 20/20* (2016.01)
(Continued)

(52) U.S. Cl.
CPC .......... *G01C 21/3461* (2013.01); *B60W 20/20* (2013.01); *B60W 20/40* (2013.01); *F01N 3/2013* (2013.01); *G01C 21/3469* (2013.01); *F01N 2240/16* (2013.01); *F01N 2590/11* (2013.01); *F01N 2900/104* (2013.01)

(58) Field of Classification Search
CPC .......... G01C 21/3461; G01C 21/3469; B60W 20/20; B60W 20/40; B60W 20/11; B60W 20/12; B60W 20/13; B60W 20/16; B60W 50/0097; B60W 10/26; F01N 3/2013; F01N 2240/16; F01N 2590/11; F01N 2900/104; B60Y 2300/67

See application file for complete search history.

(56) References Cited

U.S. PATENT DOCUMENTS

2003/0172643 A1    9/2003  Suzuki
2015/0353073 A1*  12/2015  Kinoshita ........... F02D 41/3076
                                                            903/905
2018/0334170 A1*  11/2018  Liu ....................... B60W 10/30

FOREIGN PATENT DOCUMENTS

DE    102017126091 A1      12/2017
DE    102018127550 A1 *   12/2018
JP       2003269208 A       9/2003

OTHER PUBLICATIONS

Machine Translation of DE-102018127550-A1 (Year: 2018).*

* cited by examiner

*Primary Examiner* — Brandon D Lee
(74) *Attorney, Agent, or Firm* — Hauptman Ham, LLP

(57) ABSTRACT

A control system for a hybrid vehicle includes: an electric heater configured to heat a catalyst of an internal combustion engine; a position determination unit configured to determine whether the hybrid vehicle is located in an exit area of a low emission zone where operation of the internal combustion engine is supposed to be restricted, the exit area being an area adjacent to a boundary of the low emission zone; and a heater control unit configured to turn on the electric heater when the position determination unit determines that the hybrid vehicle is located in the exit area.

14 Claims, 16 Drawing Sheets

(51) Int. Cl.
*B60W 20/40* (2016.01)
*F01N 3/20* (2006.01)

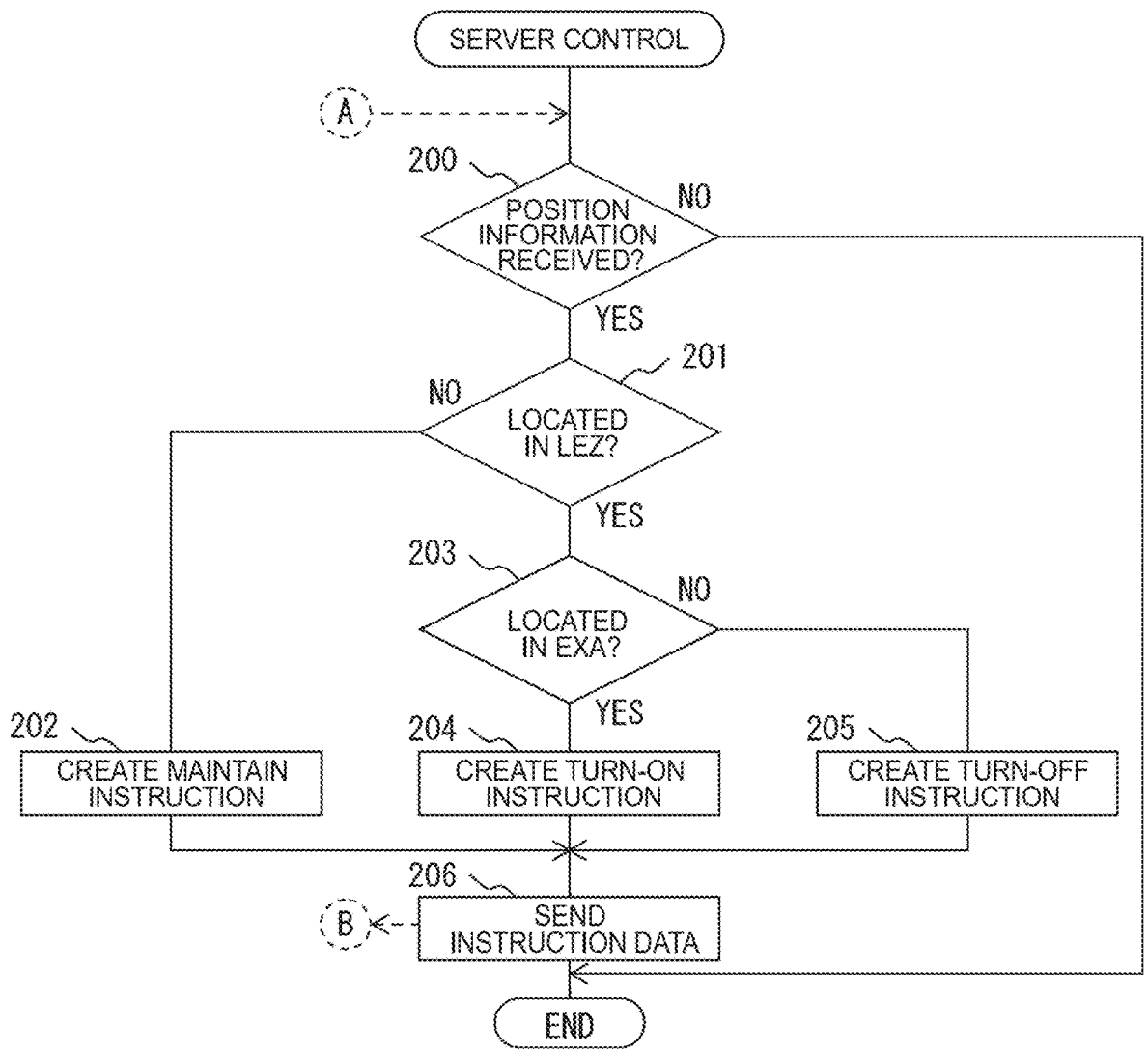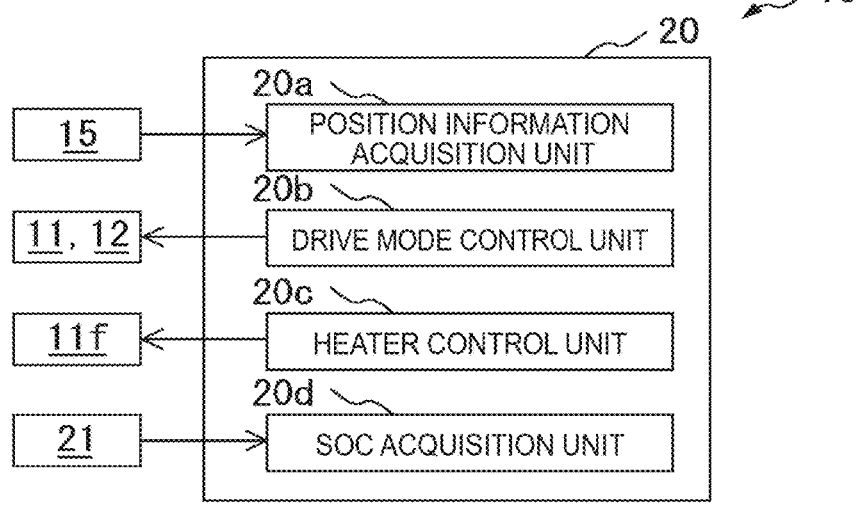

CONTROL SYSTEM AND CONTROL METHOD FOR HYBRID VEHICLE

CROSS-REFERENCE TO RELATED APPLICATION

This application claims priority to Japanese Patent Application No. 2020-109889 filed on Jun. 25, 2020 and Japanese Patent Application No. 2021-053797 filed on Mar. 26, 2021, each incorporated herein by reference in its entirety.

BACKGROUND

1. Technical Field

The present disclosure relates to control systems and control methods for hybrid vehicles.

2. Description of Related Art

Hybrid vehicles are known which include an internal combustion engine and an electric motor and whose drive mode is switched between an electric vehicle (EV) mode and a hybrid vehicle (HV) mode. The EV mode is a mode in which the internal combustion engine is stopped and the electric motor is operated, and the HV mode is a mode in which the internal combustion engine and the electric motor are operated. In the hybrid vehicles, when the state of charge (SOC) of a battery becomes lower than a predetermined first set value in the HV mode, the internal combustion engine is started to generate electricity, and the battery is charged with the generated electricity.

However, a catalyst of the internal combustion engine may be inactive when the SOC of the battery becomes lower than the first set value. Starting the internal combustion engine in this state may increase exhaust emissions. Regarding this problem, hybrid vehicles are known in which an electric heater for heating the catalyst is turned on when the SOC of the battery becomes lower than a second set value that is higher than the first set value (see, e.g., Japanese Unexamined Patent Application Publication No. 2003-269208 (JP 2003-269208 A)).

SUMMARY

A technique of setting low emission zones in, e.g., urban areas is known in the art (geofencing). The low emission zones are areas where operation of an internal combustion engine is supposed to be restricted. A hybrid vehicle normally runs on an electric motor, namely travels in the EV mode, in the low emission zone. The SOC of a battery therefore gradually decreases in the low emission zone even in consideration of regenerative control. Accordingly, there is a possibility that the internal combustion engine may be started to generate electricity as soon as the hybrid vehicle leaves the low emission zone. However, a catalyst may not be active at this time. JP 2003-269208 A does not disclose anything about this problem.

The present disclosure provides the following control system and control method for a hybrid vehicle.

A first aspect of the present disclosure relates to a control system for a hybrid vehicle. The control system for the hybrid vehicle includes: an electric heater configured to heat a catalyst of an internal combustion engine; a position determination unit configured to determine whether the hybrid vehicle is located in an exit area of a low emission zone where operation of the internal combustion engine is supposed to be restricted, the exit area being an area adjacent to a boundary of the low emission zone; and a heater control unit configured to turn on the electric heater when the position determination unit determines that the hybrid vehicle is located in the exit area. The hybrid vehicle includes the internal combustion engine and an electric motor. A drive mode of the hybrid vehicle is switched between an electric vehicle mode and a hybrid vehicle mode. The electric vehicle mode is a mode in which the internal combustion engine is stopped and the electric motor is operated, and the hybrid vehicle mode is a mode in which the internal combustion engine and the electric motor are operated.

In the first aspect, the heater control unit may be configured not to turn on the electric heater when determination is made that a state of charge of a battery of the hybrid vehicle is equal to or higher than a predetermined threshold, and may be configured to turn on the electric heater when the position determination unit determines that the hybrid vehicle is located in the exit area and determination is made that the state of charge of the battery is lower than the predetermined threshold.

In the above aspect, the control system may further include a prediction unit configured to predict whether the hybrid vehicle is going to leave the low emission zone. The heater control unit may be configured not to turn on the electric heater when the prediction unit predicts that the hybrid vehicle is not going to leave the low emission zone, and may be configured to turn on the electric heater when the position determination unit determines that the hybrid vehicle is located in the exit area and the prediction unit predicts that the hybrid vehicle is going to leave the low emission zone.

In the above aspect, the heater control unit may be configured to apply a smaller amount of current to the electric heater per unit time when a distance from the hybrid vehicle to the boundary is large than when the distance is small in a case where the position determination unit determines that the hybrid vehicle is located in the exit area.

In the above aspect, the heater control unit may be configured to turn on the electric heater in such a way that the catalyst is active when the hybrid vehicle leaves the low emission zone.

In the above aspect, the heater control unit may be configured to apply a smaller amount of current to the electric heater when determination is made that an amount of available electrical energy is smaller than a required amount of electrical energy than when determination is made that the amount of available electrical energy is larger than the required amount of electrical energy in a case where the position determination unit determines that the hybrid vehicle is located in the exit area, the amount of available electrical energy being an amount of electrical energy determined according to a state of charge of a battery of the hybrid vehicle, and the required amount of electrical energy being an amount of electrical energy required for the hybrid vehicle to leave the low emission zone in the electric vehicle mode with the catalyst being active.

In the above aspect, the heater control unit may be configured to apply no current to the electric heater so as not to turn on the electric heater when determination is made that the amount of available electrical energy is smaller than the required amount of electrical energy.

In the above aspect, the heater control unit may be configured to supply a part or all of an excess of the amount of available electrical energy over an amount of out-of-zone required electrical energy to the electric heater when determination is made that the amount of available electrical energy is smaller than the required amount of electrical energy and larger than the amount of out-of-zone required electrical energy, the amount of out-of-zone required electrical energy being an amount of electrical energy required for the hybrid vehicle to leave the low emission zone in the electric vehicle mode without turning on the electric heater.

In the above aspect, the control system may further include a guidance unit configured to guide the hybrid vehicle to a charging station within the low emission zone when determination is made that the amount of available electrical energy is smaller than the required amount of electrical energy and larger than an amount of charging required electrical energy, the amount of charging required electrical energy being an amount of electrical energy required for the hybrid vehicle to reach the charging station within the low emission zone in the electric vehicle mode without turning on the electric heater.

In the above aspect, the control system may further include a guidance unit configured to guide the hybrid vehicle out of the low emission zone when determination is made that the amount of available electrical energy is smaller than the required amount of electrical energy and larger than an amount of out-of-zone required electrical energy, the amount of out-of-zone required electrical energy being an amount of electrical energy required for the hybrid vehicle to leave the low emission zone in the electric vehicle mode without turning on the electric heater.

In the above aspect, the guidance unit may be configured to guide the hybrid vehicle out of the low emission zone.

A second aspect of the present disclosure relates to a control method for a hybrid vehicle. The control method includes: determining whether the hybrid vehicle is located in an exit area of a low emission zone where operation of an internal combustion engine is supposed to be restricted, the exit area being an area adjacent to a boundary of the low emission zone; and turning on an electric heater configured to heat a catalyst of the internal combustion engine, when determination is made that the hybrid vehicle is located in the exit area. The hybrid vehicle includes the internal combustion engine and an electric motor. A drive mode of the hybrid vehicle is switched between an electric vehicle mode and a hybrid vehicle mode. The electric vehicle mode is a mode in which the internal combustion engine is stopped and the electric motor is operated, and the hybrid vehicle mode is a mode in which the internal combustion engine and the electric motor are operated.

According to each aspect of the present disclosure, the catalyst will have reliably been activated when the hybrid vehicle leaves the low emission zone. The internal combustion engine can thus be started as soon as the hybrid vehicle leaves the low emission zone.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart of a server control routine of the first embodiment according to the present disclosure;

FIG. 10 is a functional block diagram of a vehicle in a second embodiment according to the present disclosure;

DETAILED DESCRIPTION OF EMBODIMENTS

Figure 1:
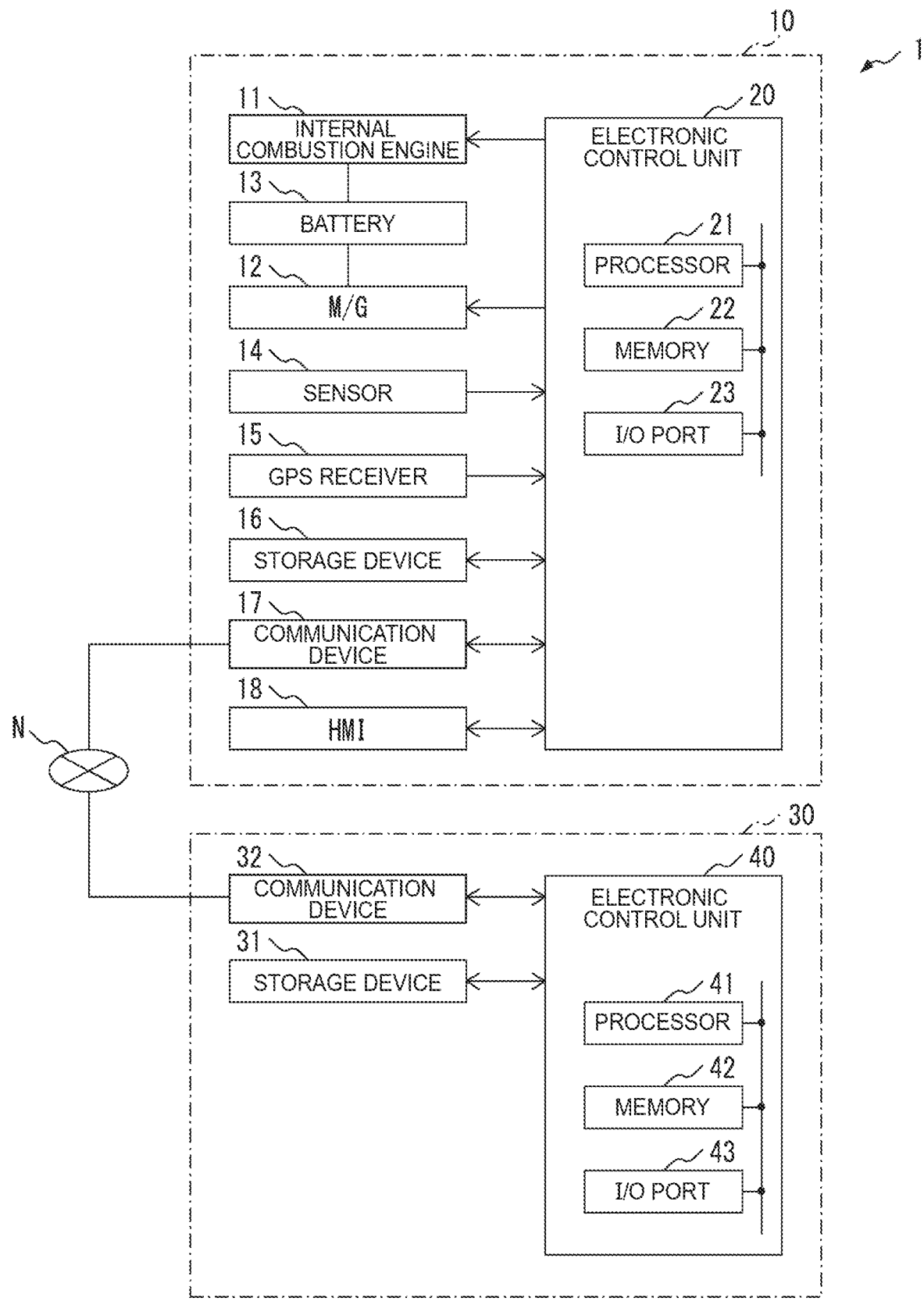
FIG. 1 is a schematic overall view of a control system of a first embodiment according to the present disclosure.

A first embodiment according to the present disclosure will be described with reference to FIGS. 1 to 9. Referring to FIG. 1, a control system 1 for a hybrid vehicle of the first embodiment according to the present disclosure includes a hybrid vehicle 10 and a server 30 outside the hybrid vehicle 10.

The hybrid vehicle 10 of the first embodiment according to the present disclosure includes an internal combustion engine 11, a motor generator (M/G) 12, a battery 13, at least one sensor 14, a Global Positioning System (GPS) receiver 15, a storage device 16, a communication device 17, a human-machine interface (HMI) 18, and an electronic control unit 20.

Figure 2:
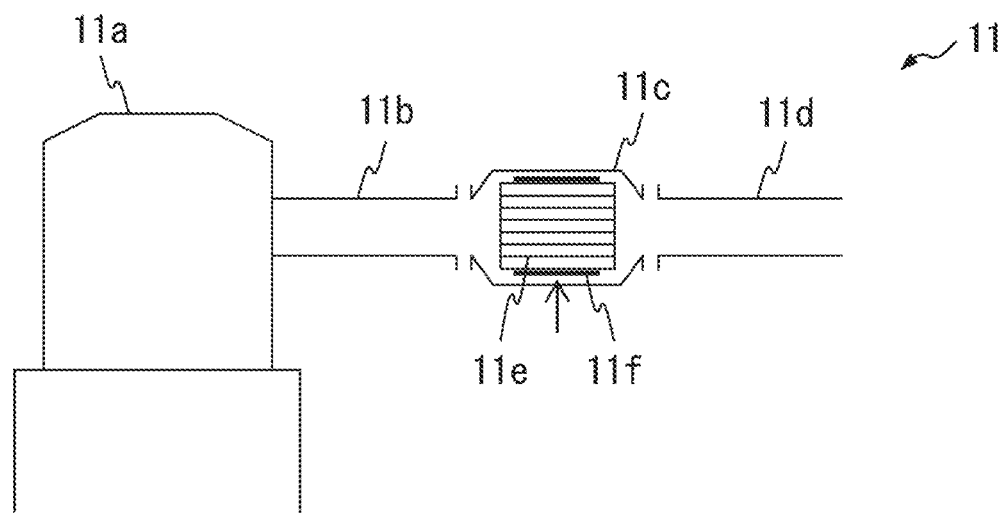
FIG. 2 schematically illustrates an internal combustion engine of the first embodiment according to the present disclosure.

The internal combustion engine 11 of the first embodiment according to the present disclosure is, e.g., a spark ignition engine or a compression ignition engine. As shown in FIG. 2, the internal combustion engine 11 of the first embodiment according to the present disclosure includes an engine body 11a, an exhaust pipe 11b coupled to the engine body 11a, a casing 11c coupled to the exhaust pipe 11b, an exhaust pipe 11d coupled to the casing 11c, a catalyst 11e housed in the casing 11c, and an electric heater 11f for heating the catalyst 11e. In the example shown in FIG. 2, the electric heater 11f is attached to the peripheral surface of the catalyst 11e. When the electric heater 11f is turned on, that is, when a current is applied to the electric heater 11f, the catalyst 11e is heated and, for example, is activated. In another example, the electric heater 11f is disposed upstream of the catalyst 11e so as to heat exhaust gas flowing into the catalyst 11e. In this case, the catalyst 11e is heated by the exhaust gas heated by the electric heater 11f. The internal combustion engine 11 (e.g., fuel injection valves, spark plugs, a throttle valve, etc.) is controlled based on signals from the electronic control unit 20.

The motor generator 12 of the first embodiment according to the present disclosure operates as an electric motor or a generator. The motor generator 12 is controlled based on signals from the electronic control unit 20.

In the first embodiment according to the present disclosure, the drive mode of the hybrid vehicle 10 can be switched between an EV mode and an HV mode. In the EV mode of the first embodiment according to the present disclosure, the internal combustion engine 11 is stopped and the motor generator 12 is operated as an electric motor. In this case, the output of the motor generator 12 is transmitted to axles. In the HV mode of the first embodiment according to the present disclosure, the internal combustion engine 11 is operated and the motor generator 12 is operated as an electric motor. In this case, in one example, the output of the internal combustion engine 11 and the output of the motor generator 12 are transmitted to the axles. In another example, the output of the motor generator 12 is transmitted to the axles, and the output of the internal combustion engine 11 is transmitted to a generator (not shown) to operate the generator. Electric power generated by the generator is sent to the motor generator 12 or the battery 13. In still another example, a part of the output of the internal combustion engine 11 and the output of the motor generator 12 are transmitted to the axles, and the rest of the output of the internal combustion engine 11 is transmitted to the generator. Electric power generated by the generator is sent to the motor generator 12 or the battery 13. In the first embodiment according to the present disclosure, in the EV mode and the HV mode, regenerative control using the motor generator 12 as a generator is performed during, e.g., deceleration operation. Electric power generated by the regenerative control is sent to the battery 13.

The battery 13 of the first embodiment according to the present disclosure is charged by electricity from the motor generator 12 operating as a generator or from the generator (not shown). In another embodiment (not shown), the battery 13 can also be charged by an external power supply. In the first embodiment according to the present disclosure, electricity is supplied from the battery 13 to the electric heater 11f of the internal combustion engine 11, the motor generator 12 operating as an electric motor, the electronic control unit 20, and other in-vehicle devices.

The sensor 14 of the first embodiment according to the present disclosure detects various raw data. Examples of the sensor 14 of the first embodiment according to the present disclosure include: a load sensor for detecting a requested vehicle load that is represented by the amount of depression of an accelerator pedal; a throttle valve opening degree sensor for detecting the throttle valve opening degree of the internal combustion engine 11; a NOx sensor for detecting the NOx concentration in exhaust gas of the internal combustion engine 11; a temperature sensor for detecting the temperature of the catalyst 11e; a rotational speed sensor for detecting the rotational speed of the internal combustion engine 11; a voltmeter for detecting the voltage of the battery 13; an ammeter for detecting the current of the battery 13; and a speed sensor for detecting the speed of the vehicle 10. Output signals of these sensors 14 are input to the electronic control unit 20.

The GPS receiver 15 of the first embodiment according to the present disclosure receives a signal from a GPS satellite and detects information indicating the absolute position (e.g., latitude and longitude) of the vehicle 10 from the received signal. The position information of the vehicle 10 is input to the electronic control unit 20.

Various data are stored in advance in the storage device 16 of the first embodiment according to the present disclosure. The communication device 17 of the first embodiment according to the present disclosure can be connected to a communication network N such as the Internet. The HMI 18 of the embodiment according to the present disclosure sends and receives information between an occupant (including a driver) of the vehicle 10 and the control system 1. Specifically, the HMI 18 has a notification function to give, e.g., a visual, auditory, tactile, or olfactory notification to the occupant of the vehicle 10 and an input function to receive an input from the occupant of the vehicle 10. The HMI 18 includes, e.g., a display, a lamp, a speaker, a vibrator, etc. for the notification function and includes, e.g., a touch panel, a button, a switch, etc. for the input function. In another embodiment (not shown), the HMI 18 does not have the input function but has the notification function.

The electronic control unit 20 of the vehicle 10 of the first embodiment according to the present disclosure includes one or more processors 21, one or more memories 22, and an input and output (I/O) port 23. The one or more processors 21, the one or more memories 22, and the I/O port 23 are connected by a bidirectional bus so that they can communicate with each other. The memory 22 includes, e.g., a read-only memory (ROM), a random access memory (RAM), etc. The memory 22 has various programs stored therein, and various functions are implemented by executing these programs by the processor 21. The internal combustion engine 11 (including the electric heater 11f), the motor generator 12, the sensor 14, the GPS receiver 15, the storage device 16, and the communication device 17 are connected to the I/O port 23 of the first embodiment according to the present disclosure so that they can communicate with the I/O port 23. In the processor 21 of the first embodiment according to the present disclosure, the state of charge (SOC) of the battery 13 is calculated based on, e.g., the voltage and current of the battery 13.

Referring to FIG. 1, the server 30 of the first embodiment according to the present disclosure includes a storage device 31, a communication device 32, and an electronic control unit 40.

Figure 3:
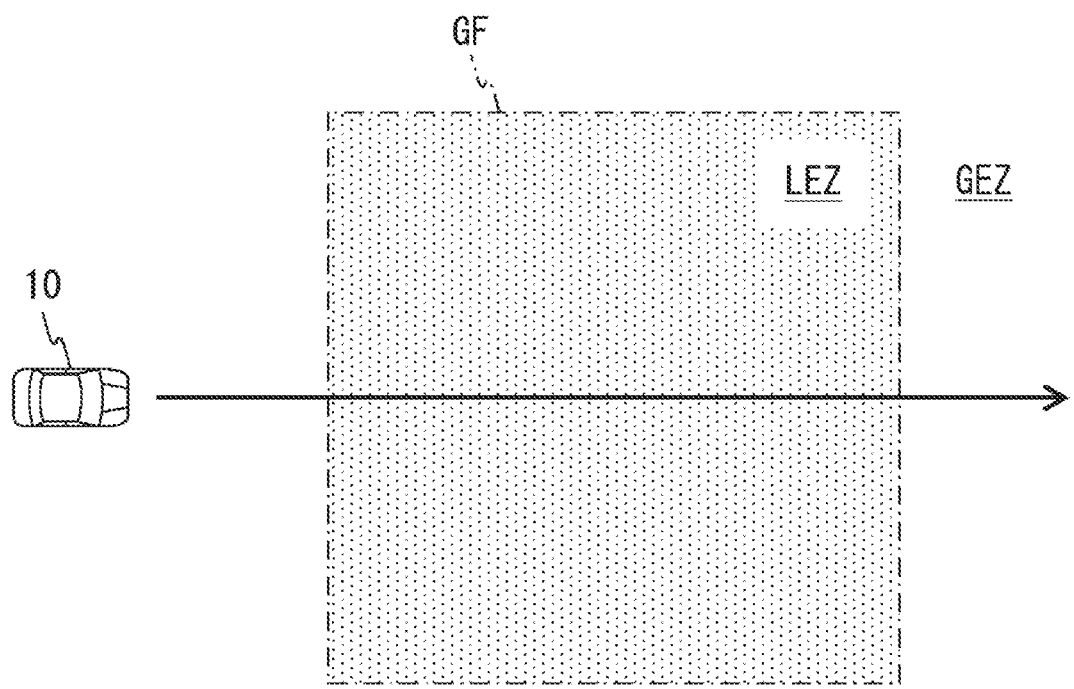
FIG. 3 schematically illustrates a low emission zone of the first embodiment according to the present disclosure.

The storage device 31 of the first embodiment according to the present disclosure has stored therein position information (e.g., latitudes and longitudes) of low emission zones where operation of the internal combustion engine 11 is supposed to be restricted. FIG. 3 schematically illustrates an example of the low emission zone LEZ of the first embodiment according to the present disclosure. The low emission zone LEZ of the first embodiment according to the present disclosure is surrounded by a closed boundary or geofence GF. For example, the low emission zones LEZs are set in urban areas. Operation of the internal combustion engine 11 is not restricted or is allowed in a zone outside the low emission zone LEZ, namely a general zone GEZ.

The communication device 32 of the first embodiment according to the present disclosure can be connected to the communication network N. The vehicle 10 and the server 30 can therefore be connected to each other via the communication network N.

Like the electronic control unit 20 of the vehicle 10, the electronic control unit 40 of the server 30 of the first embodiment according to the present disclosure includes one or more processors 41, one or more memories 42, and an I/O port 43. The one or more processors 41, the one or more memories 42, and the I/O port 43 are connected by a bidirectional bus so that they can communicate with each other. The storage device 31 and the communication device 32 are connected to the I/O port 43 of the first embodiment according to the present disclosure so that they can communicate with the I/O port 43.

Figure 4:
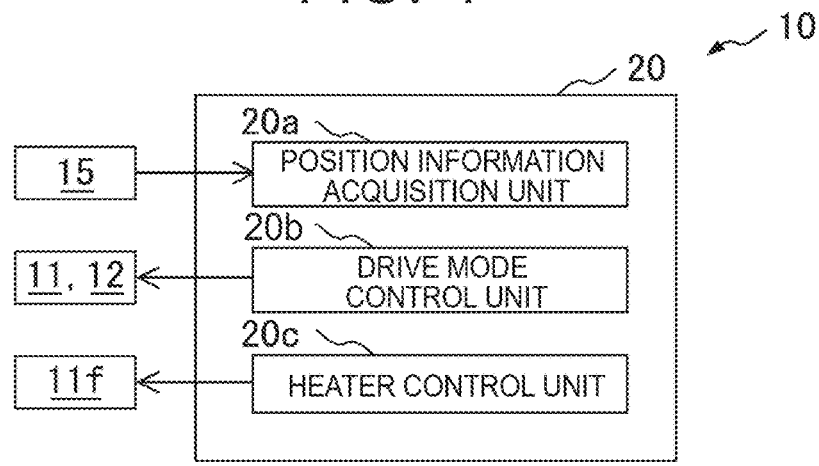
FIG. 4 is a functional block diagram of a vehicle in the first embodiment according to the present disclosure.

FIG. 4 is a functional block diagram of the vehicle 10 of the first embodiment according to the present disclosure. Referring to FIG. 4, the electronic control unit 20 of the vehicle 10 includes a position information acquisition unit 20a, a drive mode control unit 20b, and a heater control unit 20c.

The position information acquisition unit 20a of the first embodiment according to the present disclosure acquires the position information of the vehicle 10 from the GPS receiver 15. The position information acquisition unit 20a sends this position information to the server 30.

Referring to FIG. 4, the drive mode control unit 20b of the first embodiment according to the present disclosure is configured to switch the drive mode between the EV mode and the HV mode. In one example, the EV mode is selected when the requested vehicle load is lower than a predetermined set load, and the drive mode is switched to the HV mode when the requested vehicle load becomes equal to or higher than the set load. The EV mode is also selected when the SOC of the battery 13 is equal to or higher than a predetermined set SOC, and the drive mode is switched to the HV mode when the SOC of the battery 13 becomes lower than the set SOC.

The heater control unit 20c of the first embodiment according to the present disclosure controls whether to turn on or off the electric heater 11f (FIG. 2) of the internal combustion engine 11. In one example, when the internal combustion engine 11 should be started but the catalyst 11e is inactive, the electric heater 11f is turned on, namely a current is applied to the electric heater 11f. When the internal combustion engine 11 is started subsequently, the electric heater 11f is turned off, namely a current is no longer applied to the electric heater 11f. The internal combustion engine 11 is not started until the catalyst 11e becomes active. That is, the internal combustion engine 11 is started when the catalyst 11e becomes active. On the other hand, when the internal combustion engine 11 should not be started or when the catalyst 11e is active, the electric heater 11f is turned off. As will be described later, the heater control unit 20c turns on or off the electric heater 11f according to instruction data received by the vehicle 10.

Figure 5:
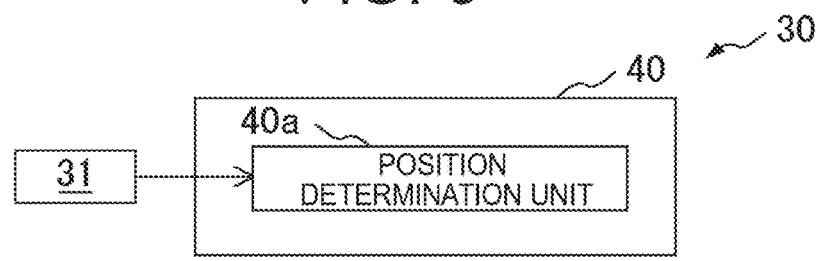
FIG. 5 is a functional block diagram of a server in the first embodiment according to the present disclosure.

FIG. 5 is a functional block diagram of the server 30 of the first embodiment according to the present disclosure. Referring to FIG. 5, the electronic control unit 40 of the server 30 includes a position determination unit 40a.

The position determination unit 40a of the first embodiment according to the present disclosure determines from the position information of the vehicle 10 sent from the vehicle 10 to the server 30 and the position information of the low emission zones LEZs stored in the storage device 31 whether the vehicle 10 is located in the low emission zone LEZ. The position determination unit 40a also determines whether the vehicle 10 is located in an exit area EXA (which will be described later). The position determination unit 40a creates instruction data according to the determination results and sends the instruction data to the vehicle 10.

Figure 6:
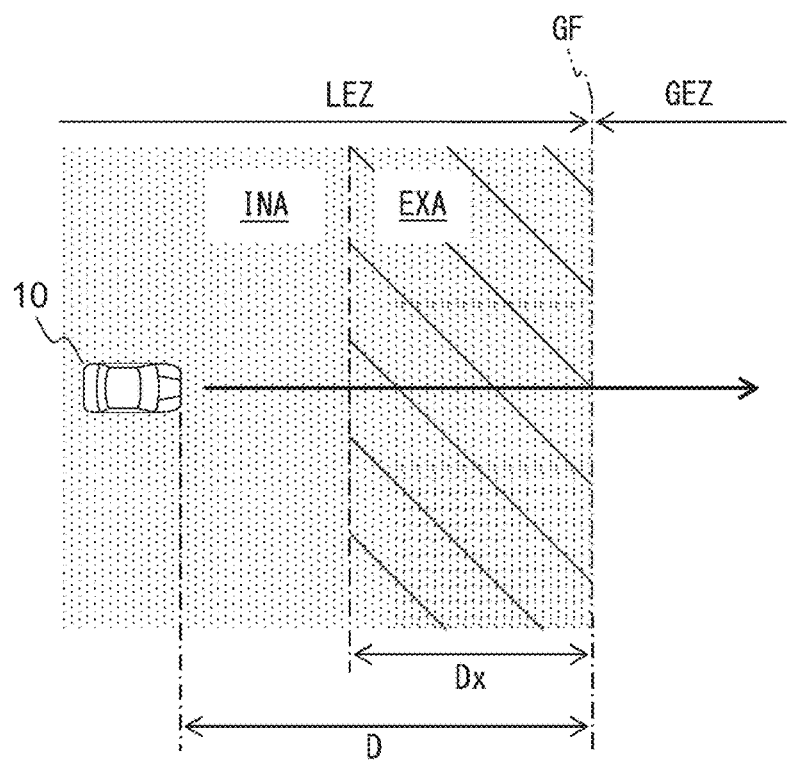
FIG. 6 schematically illustrates a low emission zone and an exit area of the first embodiment according to the present disclosure.

In the first embodiment according to the present disclosure, as shown in FIG. 6, the low emission zone LEZ is divided into two areas: the exit area EXA adjacent to the boundary GF of the low emission zone LEZ or the general zone GEZ, and an inner area INA located inward of the exit area EXA. Accordingly, the vehicle 10 will need to pass the exit area EXA in order to leave the low emission zone LEZ, namely in order to enter the general zone GEZ from the low emission zone LEZ. In the first embodiment according to the present disclosure, the exit area EXA is defined as, e.g., an area whose distance from the boundary GF (e.g., traveled distance) is smaller than a predetermined threshold Dx. In FIG. 6, D represents the distance (e.g., traveled distance) from the current position of the vehicle 10 to the boundary GF or the general zone GEZ.

In the first embodiment according to the present disclosure, when it is determined that the distance D is smaller than the threshold Dx, it is determined that the vehicle 10 is located in the exit area EXA. When it is determined that the distance D is greater than the threshold Dx, it is determined that the vehicle 10 is located outside the exit area EXA, namely in the inner area INA. Accordingly, the threshold Dx can be considered to be position information of the exit area EXA.

In the first embodiment according to the present disclosure, when the vehicle 10 acquires the position information of the vehicle 10, the vehicle 10 sends the acquired position information of the vehicle 10 to the server 30. When the position determination unit 40a of the server 30 receives the position information of the vehicle 10, the position determination unit 40a determines from the received position information of the vehicle 10 and the position information of the low emission zones LEZs stored in the storage device 31 whether the vehicle 10 is located in the low emission zone LEZ. When the position determination unit 40a determines that the vehicle 10 is located in the general zone GEZ, the position determination unit 40a creates instruction data including a maintain instruction and sends the instruction data to the vehicle 10.

On the other hand, when the position determination unit 40a determines that the vehicle 10 is located in the low emission zone LEZ, the position determination unit 40a determines from the position information of the vehicle 10 and the position information of the exit area EXA whether the vehicle 10 is located in the exit area EXA. When the position determination unit 40a determines that the vehicle 10 is located outside the exit area EXA, that is, in the inner area INA, the position determination unit 40a creates instruction data including a turn-off instruction and sends the instruction data to the vehicle 10. When the position determination unit 40a determines that the vehicle 10 is located in the exit area EXA, the position determination unit 40a creates instruction data including a turn-on instruction and sends the instruction data to the vehicle 10.

When the vehicle 10 receives the instruction data from the server 30, the heater control unit 20c of the vehicle 10 determines the type of instruction included in the received instruction data. When the heater control unit 20c determines that the instruction data includes a maintain instruction, the heater control unit 20c maintains the operating state of the electric heater 11f. That is, when the electric heater 11f is on, the heater control unit 20c keeps the electric heater 11f on. When the electric heater 11f is off, the heater control unit 20c keeps the electric heater 11f off. When the heater control unit 20c determines that the instruction data includes a turn-off instruction, the heater control unit 20c turns off the electric heater 11f. When the heater control unit 20c determines that the instruction data includes a turn-on instruction, the heater control unit 20c turns on the electric heater 11f.

Figure 7:
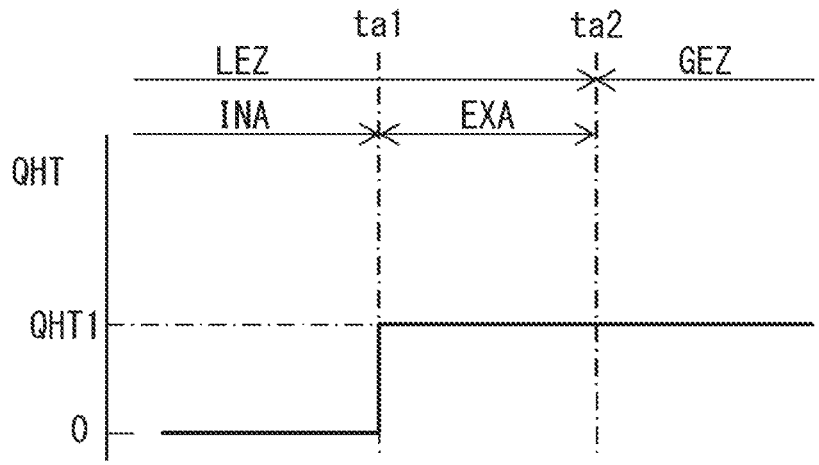
FIG. 7 is a timing chart illustrating the first embodiment according to the present disclosure.

That is, in an example of FIG. 7, it is determined until time ta1 that the vehicle 10 is located in the inner area INA of the low emission zone LEZ. In this case, the electric heater 11f is turned off according to the turn-off instruction (amount of current QHT=0). When it is determined at time ta1 that the vehicle 10 has entered the exit area EXA, the electric heater 11f is turned on according to the turn-on instruction (QHT>0). In the example of FIG. 7, the amount of current QHT that is applied to the electric heater 11f per unit time is a fixed amount QHT1. As a result, heating of the catalyst 11e is started. When it is subsequently determined at time ta2 that the vehicle 10 has left the low emission zone LEZ and has entered the general zone GEZ, the operating state of the electric heater 11f is maintained according to the maintain instruction. In the example of FIG. 7, the electric heater 11f is kept on.

In the first embodiment according to the present disclosure, as described above, the drive mode is switched to the EV mode or the HV mode based on the requested vehicle load and the SOC of the battery 13. Accordingly, in order to maintain the EV mode in the low emission zone LEZ or to prevent the drive mode from being switched to the HV mode in the low emission zone LEZ, the vehicle 10 is required to adjust the requested vehicle load (e.g., the amount of depression of the accelerator pedal), manage the SOC of the battery 13, etc. In another embodiment (not shown), when it is determined that the vehicle 10 is located in the low emission zone LEZ, the drive mode control unit 20b automatically switches the drive mode to the EV mode and maintains the EV mode.

In any case, when the vehicle 10 is located in the low emission zone LEZ, the SOC of the battery 13 gradually decreases even in consideration of the regenerative control. Accordingly, there is a possibility that the internal combustion engine 11 may be started to generate electricity as soon as the vehicle 10 leaves the low emission zone LEZ, namely as soon as the vehicle 10 enters the general zone GEZ.

In this respect, in the first embodiment according to the present disclosure, the electric heater 11f is turned on when it is determined that the vehicle 10 has entered the exit area EXA, namely before the vehicle 10 leaves the low emission zone LEZ. The catalyst 11e can therefore be activated before the vehicle 10 leaves the exit area EXA or the low emission zone LEZ. Accordingly, as soon as the vehicle 10 leaves the low emission zone LEZ, the internal combustion engine 11 can be started with the catalyst 11e having sufficient exhaust gas control capability.

The heater control unit 20c of the first embodiment according to the present disclosure turns on the electric heater 11f in such a way the catalyst 11e is active when the vehicle 10 leaves the low emission zone LEZ. Accordingly, the internal combustion engine 11 can be started as soon as the vehicle 10 leaves the low emission zone LEZ, and the amount of electricity that is required to keep the catalyst 11e active until the internal combustion engine 11 is started is reduced.

In the first embodiment according to the present disclosure, as described above, when the distance D from the vehicle 10 to the boundary GF becomes smaller than the threshold Dx, it is determined that the vehicle 10 has entered the exit area EXA, and the electric heater 11f is turned on. In the first embodiment according to the present disclosure, the threshold Dx is set so that catalyst 11e is active when the vehicle 10 leaves the low emission zone LEZ. In one example, time tR it takes to activate the catalyst 11e is first calculated from the current temperature of the catalyst 11e, the activation temperature of the catalyst 11e, and the amount of current QHT (e.g., QHT1 described above) that is applied to the electric heater 11f per unit time. Next, the traveled distance of the vehicle 10 is calculated on the assumption that the vehicle 10 has traveled at a predicted speed along a predicted travel route for the time tR. The threshold Dx is set to this traveled distance. In one example, the predicted travel route is determined based on the travel history of the vehicle 10 or other vehicle(s). The travel history of the vehicle 10 or other vehicle(s) is determined based on, e.g., the position information of the vehicle 10 or other vehicle(s) sent to the server 30. In another example, a travel route determined by a navigation system (not shown) of the vehicle 10 is sent from the vehicle 10 to the server 30, and the predicted travel route is determined based on this travel route. In one example, the predicted speed is determined based on the travel history of the vehicle 10 or other vehicle(s). In this case, the predicted speed is determined as, e.g., a function of the position of the vehicle 10 or a function of time. In another example, the predicted speed is determined based on a speed limit.

Figure 8:
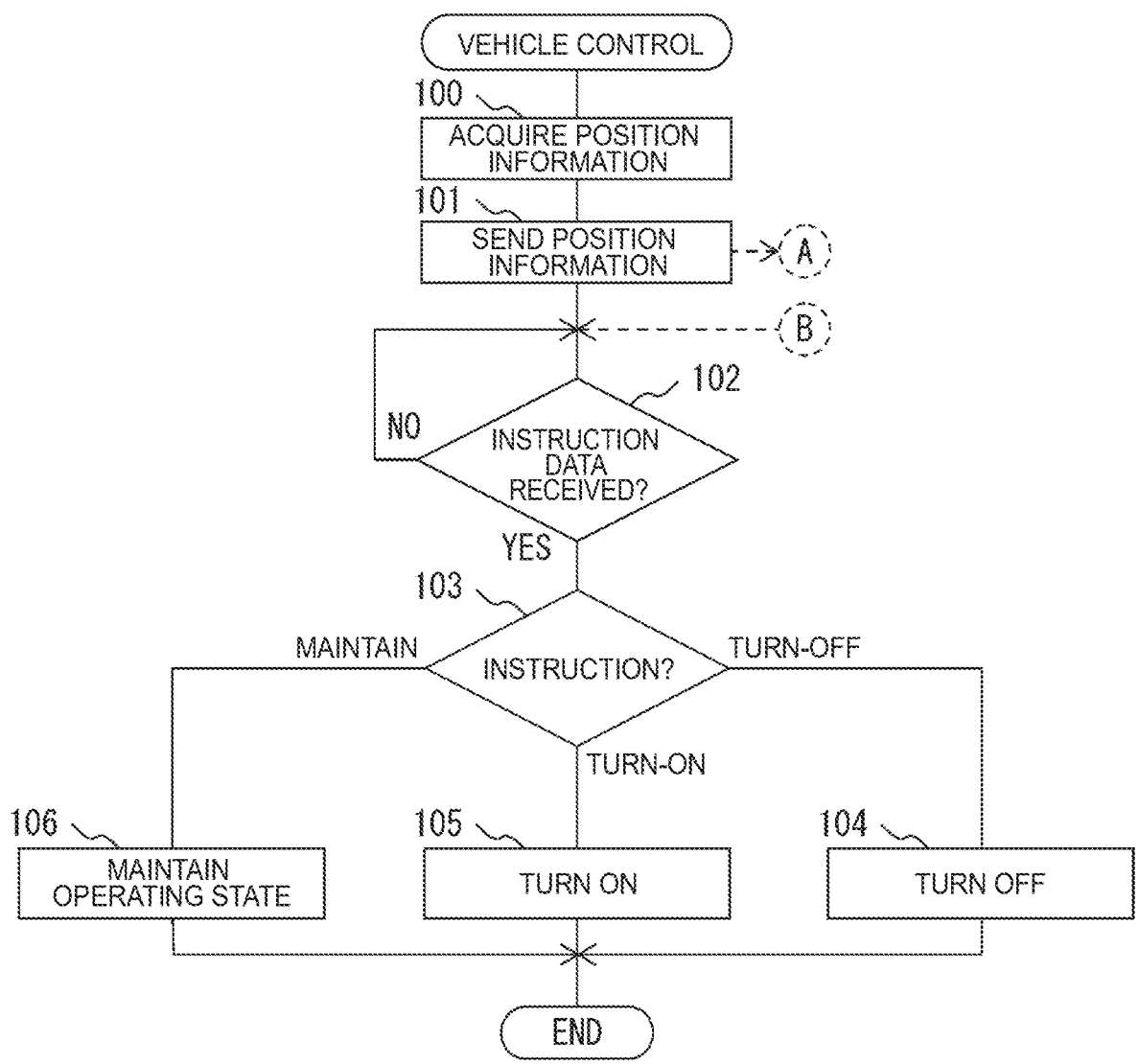
FIG. 8 is a flowchart of a vehicle control routine of the first embodiment according to the present disclosure.

FIG. 8 illustrates a routine for performing control in the vehicle 10 in the first embodiment according to the present disclosure. For example, this routine is repeated at predetermined set time intervals. Referring to FIG. 8, in step 100, the position information of the vehicle 10 is acquired. In the following step 101, the position information of the vehicle 10 is sent to the server 30. In the subsequent step 102, it is determined whether instruction data has been received from the server 30. Step 102 is repeated until it is determined that instruction data has been received from the server 30. When it is determined that instruction data has been received from the server 30, the routine proceeds to step 103, and the type of instruction included in the received instruction data is determined. When it is determined that the instruction data includes a turn-off instruction, the routine proceeds to step 104, and the electric heater 11f is turned off. When it is determined that the instruction data includes a turn-on instruction, the routine proceeds to step 105, and the electric heater 11f is turned on. When it is determined that the instruction data includes a maintain instruction, the routine proceeds to step 106, and the operating state of the electric heater 11f is maintained.

FIG. 9 illustrates a routine for performing control in the server 30 in the first embodiment according to the present disclosure. For example, this routine is repeated at predetermined set time intervals. Referring to FIG. 9, in step 200, it is determined whether the position information of the vehicle 10 has been received from the vehicle 10. When it is determined that the position information of the vehicle 10 has not been received, the process cycle is ended. When it is determined that the position information of the vehicle 10 has been received, the routine proceeds to step 201, and it is determined whether the vehicle 10 is located in the low emission zone LEZ. When it is determined that the vehicle 10 is not located in the low emission zone LEZ, namely when it is determined that the vehicle 10 is located in the general zone GEZ, the routine proceeds to step 202, and instruction data including a maintain instruction is created. The routine then proceeds to step 206. On the other hand, when it is determined that the vehicle 10 is located in the low emission zone LEZ, the routine proceeds to step 203, and it is determined whether the vehicle 10 is located in the exit area EXA. When it is determined that the vehicle 10 is located in the exit area EXA, the routine proceeds to step 204, and instruction data including a turn-on instruction is created. The routine then proceeds to step 206. When it is determined that the vehicle 10 is not located in the exit area EXA, namely when it is determined that the vehicle 10 is located in the inner area INA, the routine proceeds to step 205, and instruction data including a turn-off instruction is created. The routine then proceeds to step 206. In step 206, the instruction data is sent to the vehicle 10.

Next, a second embodiment according to the present disclosure will be described with reference to FIGS. 10 to 13. The second embodiment according to the present disclosure is different from the first embodiment according to the present disclosure in the following points. As shown in FIG. 10, the electronic control unit 20 of the vehicle 10 of the second embodiment according to the present disclosure further includes an SOC acquisition unit 20d. The SOC acquisition unit 20d acquires the SOC of the battery 13 from, e.g., the processor 21.

In the first embodiment according to the present disclosure, the electric heater 11f is turned on when it is determined that the vehicle 10 is located in the exit area EXA. Accordingly, the exhaust gas control function of the catalyst 11e can be expected even when the internal combustion engine 11 is operated immediately after the vehicle 10 leaves the low emission zone LEZ. However, when the SOC of the battery 13 is high, there is little need to operate the internal combustion engine 11 to generate electricity as soon as the vehicle 10 leaves the low emission zone LEZ.

In view of this, in the second embodiment according to the present disclosure, when it is determined that the vehicle 10 is located in the low emission zone LEZ, and the SOC of the battery 13 is equal to or higher than a predetermined threshold SOCx, the electric heater 11f is not turned on. However, when it is determined that the vehicle 10 is located in the low emission zone LEZ, and the SOC of the battery 13 is lower than the predetermined threshold SOCx, the electric heater 11f is turned on.

Figure 11:
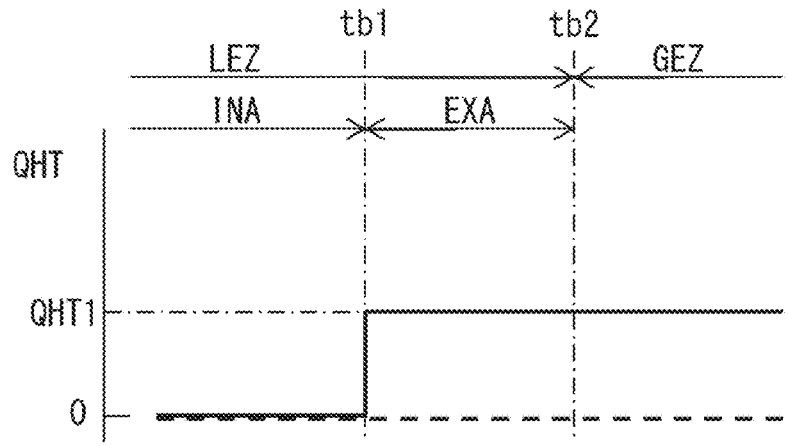
FIG. 11 is a timing chart illustrating the second embodiment according to the present disclosure.

In an example of FIG. 11, it is determined until time tb1 that the vehicle 10 is located in the inner area INA of the low emission zone LEZ. In this case, the electric heater 11f is turned off. When it is determined at time tb1 that the vehicle 10 has entered the exit area EXA and it is determined at this time that the SOC of the battery 13 is lower than the threshold SOCx, the electric heater 11f is turned on as shown by a continuous line in FIG. 11. On the other hand, when it is determined at time tb1 that the vehicle 10 has entered the exit area EXA and it is determined at this time that the SOC of the battery 13 is equal to or higher than the threshold SOCx, the electric heater 11f is not turned on as shown by a dashed line in FIG. 11.

Figure 12:
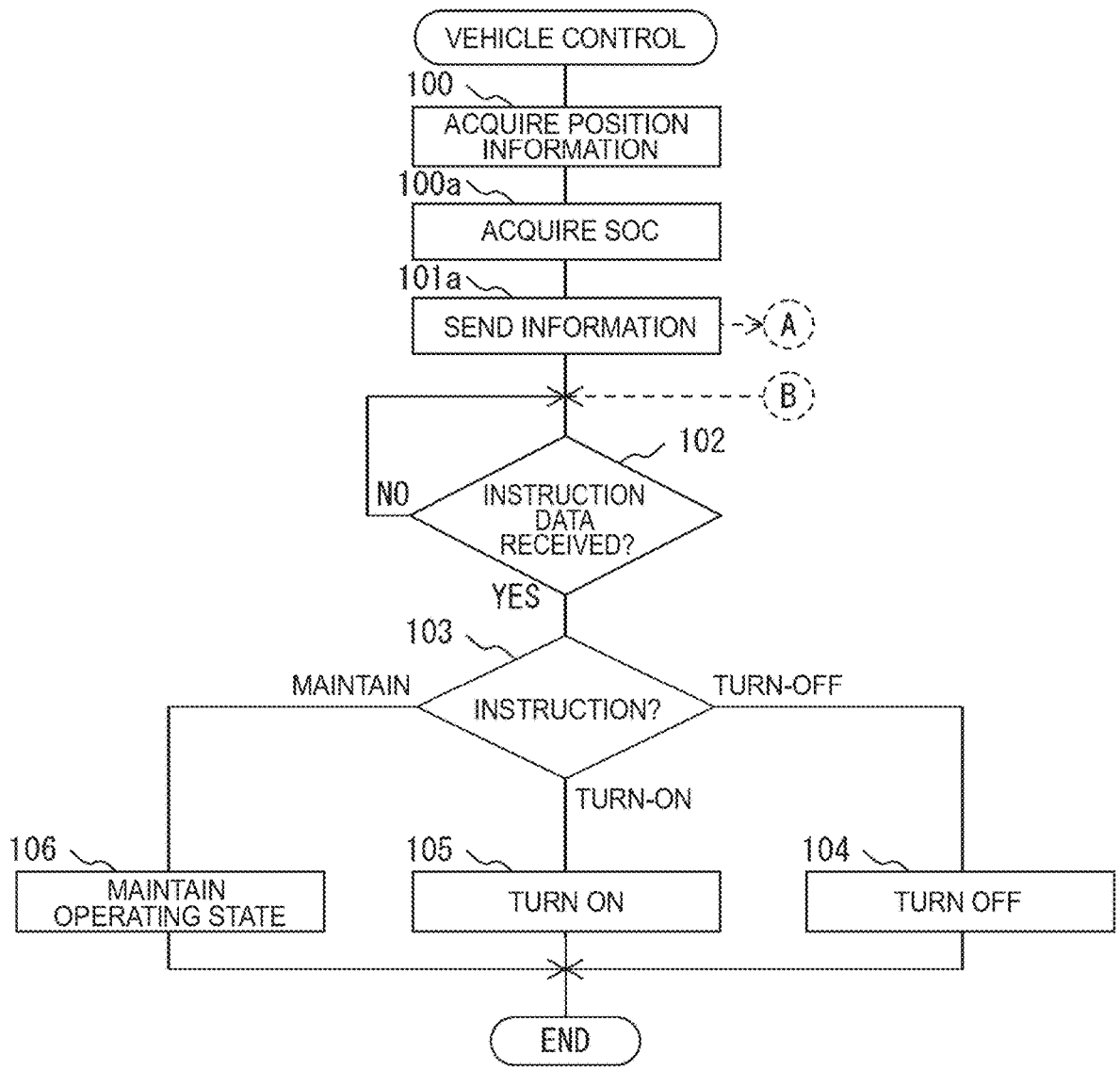
FIG. 12 is a flowchart of a vehicle control routine of the second embodiment according to the present disclosure.

FIG. 12 illustrates a routine for performing control in the vehicle 10 in the second embodiment according to the present disclosure. The routine of FIG. 12 is different from the routine of FIG. 8 in the following points. In the routine of FIG. 12, the routine proceeds from step 100 to step 100a, and the SOC of the battery 13 is acquired. In the following step 101a, the position information of the vehicle 10 and the SOC of the battery 13 are sent to the server 30.

Figure 13:
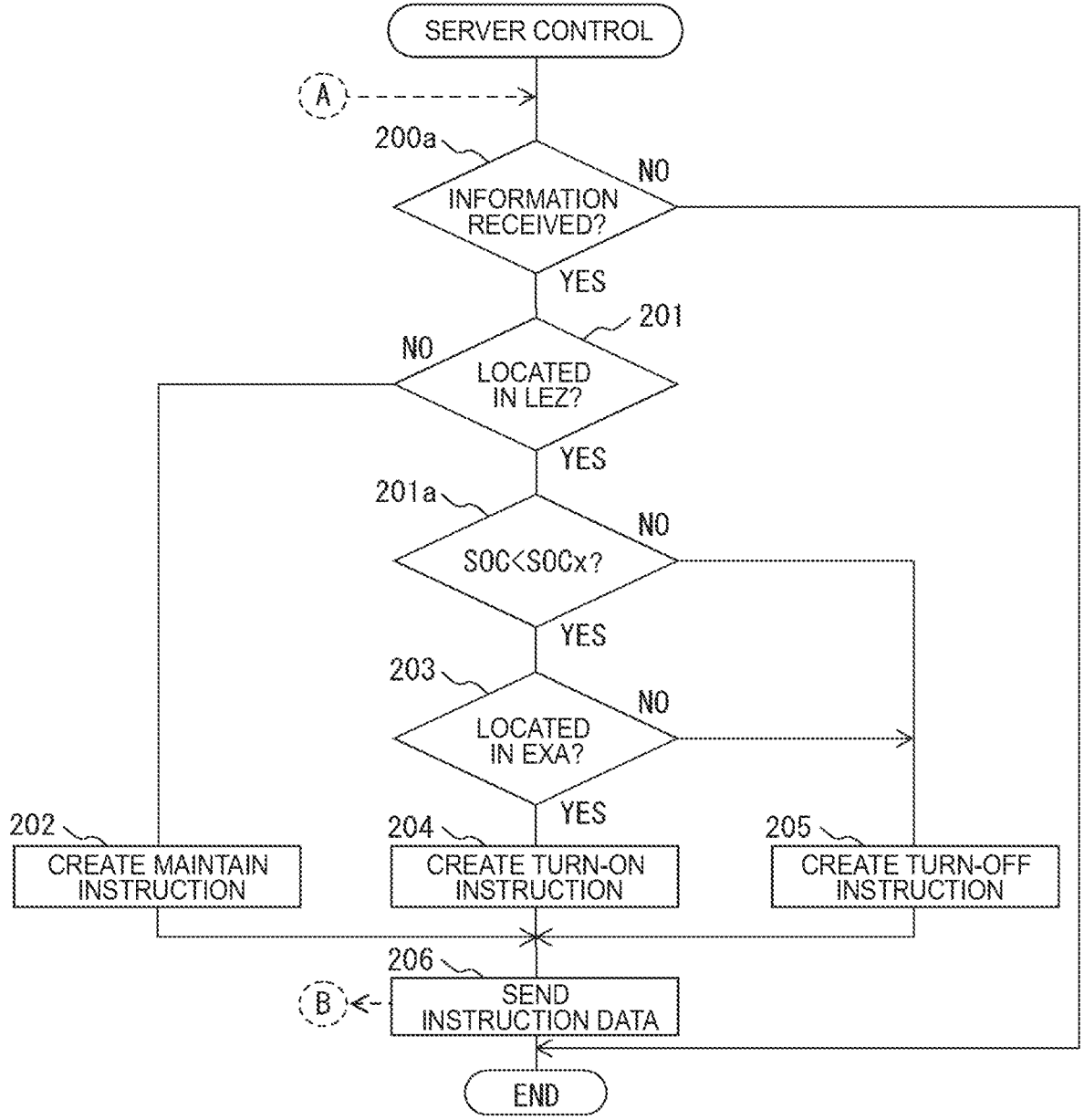
FIG. 13 is a flowchart of a server control routine of the second embodiment according to the present disclosure.

FIG. 13 illustrates a routine for performing control in the server 30 in the second embodiment according to the present disclosure. The routine of FIG. 13 is different from the routine of FIG. 9 in the following points. In the routine of FIG. 13, it is first determined in step 200a whether the position information of the vehicle 10 and the SOC of the battery 13 have been received from the vehicle 10. When it is determined that the position information of the vehicle 10 and the SOC of the battery 13 have not been received from the vehicle 10, the process cycle is ended. When it is determined that the position information of the vehicle 10 and the SOC of the battery 13 have been received from the vehicle 10, the routine proceeds to step 201. When it is determined in step 201 that the vehicle 10 is located in the low emission zone LEZ, the routine proceeds to step 201a, and it is determined whether the SOC of the battery 13 is lower than the threshold SOCx. When SOC<SOCx, the routine proceeds to step 203. When SOC SOCx, the routine proceeds to step 205.

In the second embodiment according to the present disclosure, the server 30 determines whether the SOC of the battery 13 is lower than the threshold SOCx. In another embodiment (not shown), the vehicle 10 determines whether the SOC of the battery 13 is lower than the threshold SOCx. In this case, it is not necessary to send the SOC of the battery 13 to the server 30.

Figure 14:
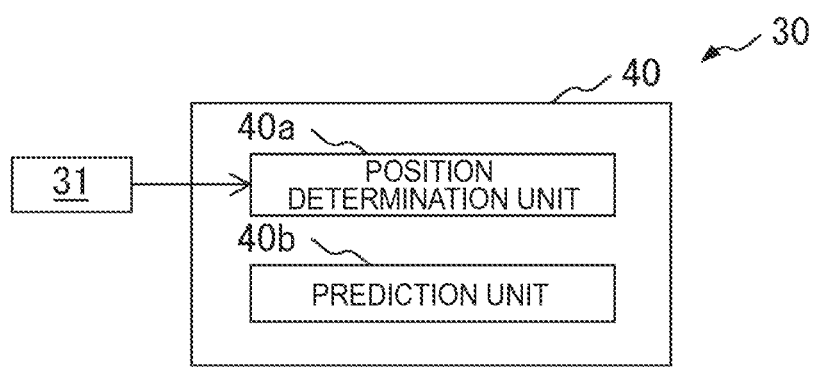
FIG. 14 is a functional block diagram of a server in a third embodiment according to the present disclosure.
Figure 15:
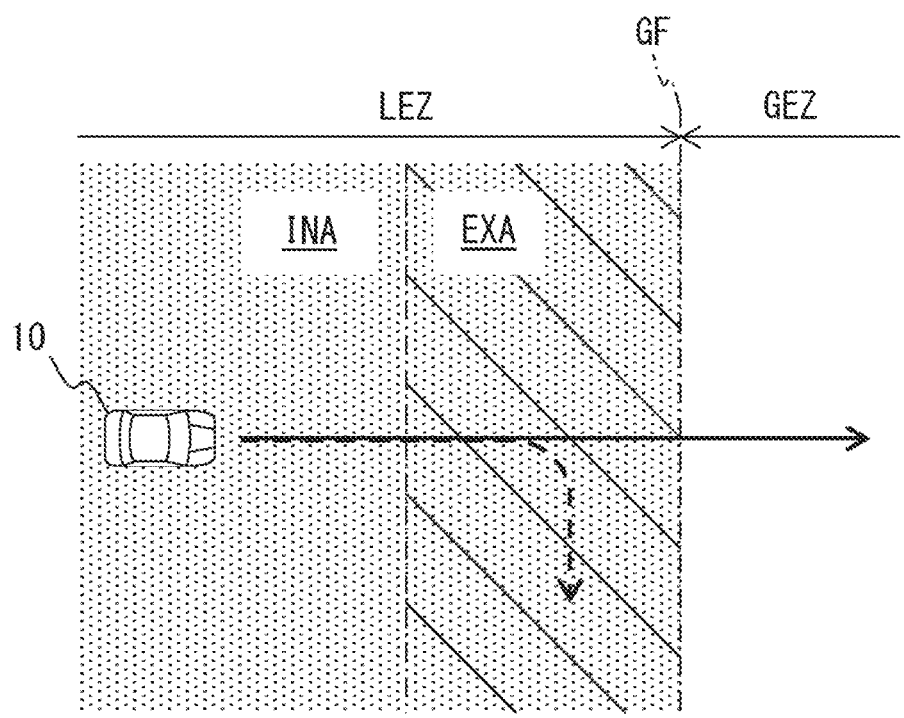
FIG. 15 schematically illustrates a low emission zone and an exit area of the third embodiment according to the present disclosure.

Next, a third embodiment according to the present disclosure will be described with reference to FIGS. 14 to 16. The third embodiment according to the present disclosure is different from the second embodiment according to the present disclosure in the following points. As shown in FIG. 14, the electronic control unit 40 of the server 30 of the third embodiment according to the present disclosure further includes a prediction unit 40b. The prediction unit 40b predicts whether the vehicle 10 will leave the low emission zone LEZ.

In the second embodiment according to the present disclosure, the electric heater 11f is turned on when it is determined that the vehicle 10 has moved from the inner area INA into the exit area EXA. As a result, the catalyst 11e will have been activated when the vehicle 10 leaves the low emission zone LEZ as shown by a continuous line in FIG. 15. However, even when the vehicle 10 has moved from the inner area INA into the exit area EXA, the vehicle 10 may not leave but stay in the low emission zone LEZ as shown by a dashed line in FIG. 15. In the case where the vehicle 10 stays in the low emission zone LEZ, the internal combustion engine 11 is not operated, and it is not necessary to turn on the electric heater 11f.

In the third embodiment according to the present disclosure, it is predicted whether the vehicle 10 will leave the low emission zone LEZ. When it is predicted that the vehicle 10 will not leave the low emission zone LEZ, the electric heater 11f is not turned on. On the other hand, when it is predicted that the vehicle 10 will leave the low emission zone LEZ, the electric heater 11f is turned on. As a result, electricity is effectively used.

In the third embodiment according to the present disclosure, it is determined based on the travel history of the vehicle 10 (own vehicle) or other vehicle(s) whether the vehicle 10 will leave the low emission zone LEZ. In one example, the probability that the vehicle 10 will leave the low emission zone LEZ from the current position is calculated based on the travel history of the vehicle 10 or other vehicle(s). When it is determined that the probability is equal to or higher than a reference value, it is determined that the vehicle 10 will leave the low emission zone LEZ. When it is determined that the probability is lower than the reference value, it is determined that the vehicle 10 will not leave the low emission zone LEZ. In another embodiment (not shown), a travel route determined by the navigation system (not shown) of the vehicle 10 is sent from the vehicle 10 to the server 30, and it is determined based on this travel route whether the vehicle 10 will leave the low emission zone LEZ.

Figure 16:
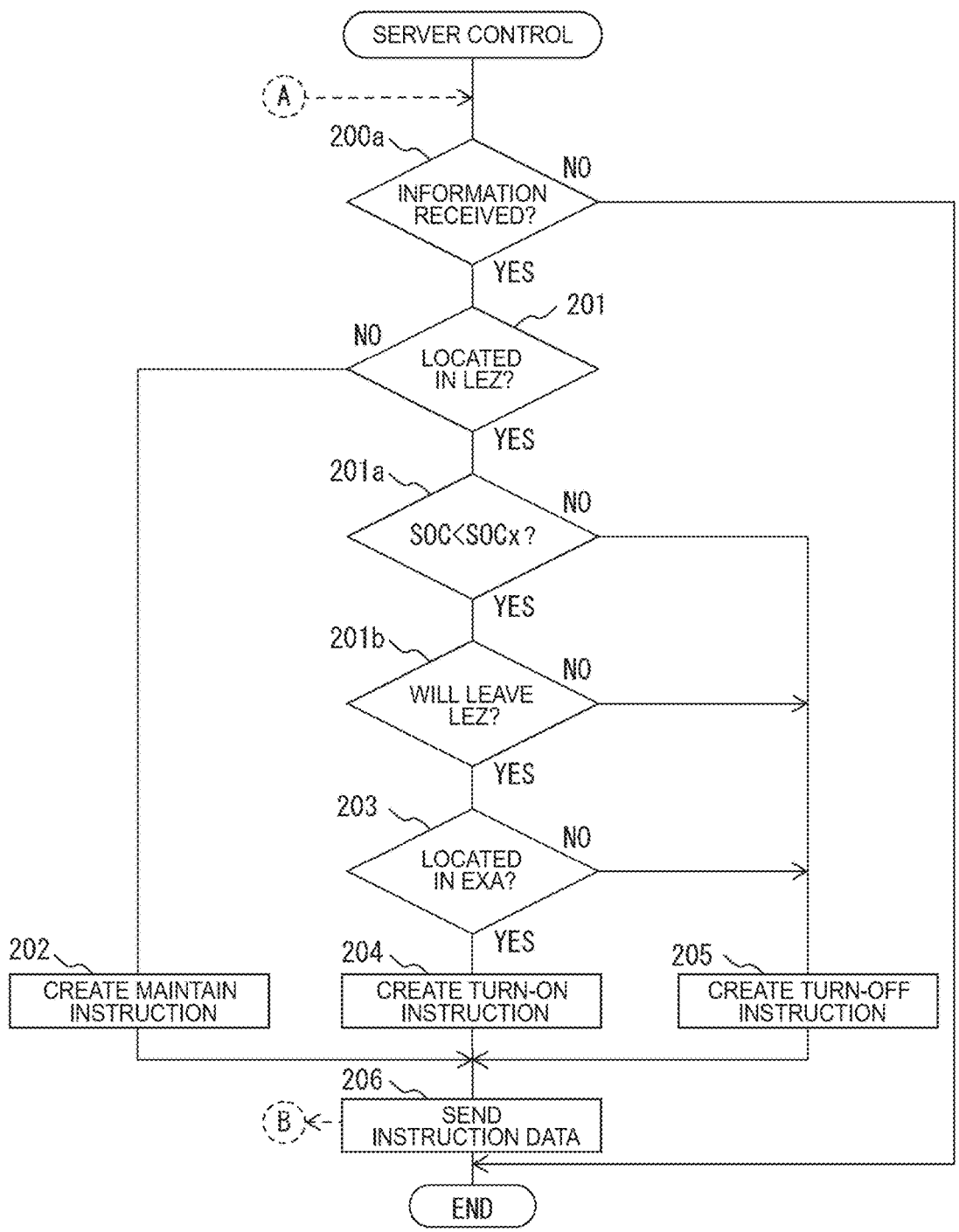
FIG. 16 is a flowchart of a server control routine of the third embodiment according to the present disclosure.

FIG. 16 illustrates a routine for performing control in the server 30 in the third embodiment according to the present disclosure. The routine of FIG. 16 is different from the routine of FIG. 13 in the following points. In the routine of FIG. 16, when SOC<SOCx in step 201a, the routine proceeds to step 201b, and it is predicted whether the vehicle 10 will leave the low emission zone LEZ. When it is predicted that the vehicle 10 will leave the low emission zone LEZ, the routine proceeds to step 203. When it is predicted that the vehicle 10 will not leave the low emission zone LEZ, the routine proceeds to step 205.

In the third embodiment according to the present disclosure, the server 30 determines whether the vehicle 10 will leave the low emission zone LEZ. In another embodiment (not shown), the vehicle 10 determines whether the vehicle 10 will leave the low emission zone LEZ.

Figure 17:
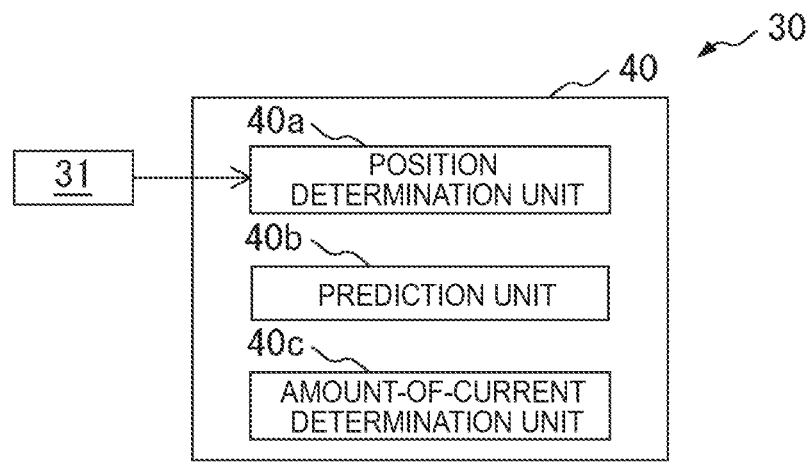
FIG. 17 is a functional block diagram of a server in a fourth embodiment according to the present disclosure.

Next, a fourth embodiment according to the present disclosure will be described with reference to FIGS. 17 to 21. The fourth embodiment according to the present disclosure is different from the third embodiment according to the present disclosure in the following points. As shown in FIG. 17, the electronic control unit 40 of the server 30 of the fourth embodiment according to the present disclosure further includes an amount-of-current determination unit 40c. The amount-of-current determination unit 40c determines a desired value QHTtgt of the amount of current QHT that is applied to the electric heater 11f per unit time when the electric heater 11f is turned on. Instruction data that is sent to the vehicle 10 when the electric heater 11f is turned on includes the turn-on instruction described above and the desired value QHTtgt. When the heater control unit 20c of the vehicle 10 receives the instruction data, the heater control unit 20c of the vehicle 10 controls the amount of current QHT that is applied to the electric heater 11f to the desired value QHTtgt included in the instruction data.

The heater control unit 20c of the first to third embodiments according to the present disclosure keeps the amount of current QHT that is applied to the electric heater 11f per unit time at the fixed amount QHT1 when turning on the electric heater 11f (FIGS. 7 and 11). On the other hand, the heater control unit 20c of the fourth embodiment according to the present disclosure changes the amount of current QHT according to the distance D from the vehicle 10 to the boundary GF.

Figure 18:
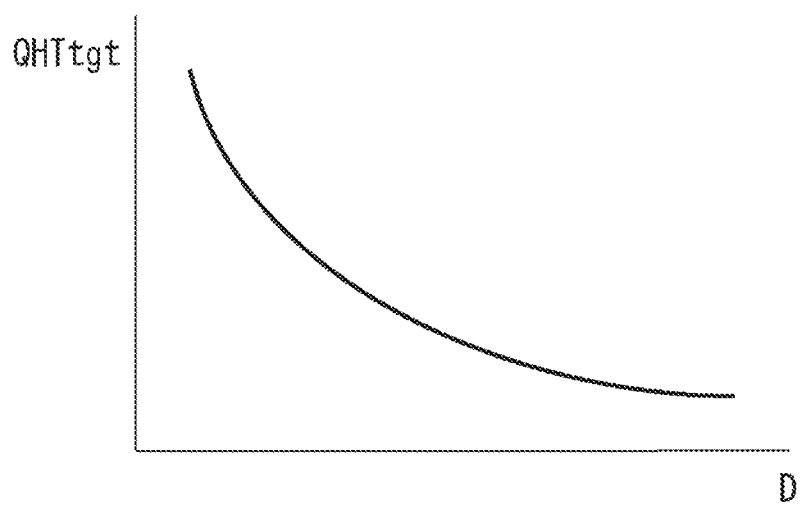
FIG. 18 is a graph illustrating a map of the amount of current QHT in the fourth embodiment according to the present disclosure.

When the distance D is large, the vehicle 10 is located away from the boundary GF, and it is unlikely that the vehicle 10 will leave the low emission zone LEZ. On the other hand, when the distance D is small, the vehicle 10 is located near the boundary GF, and it is highly likely that the vehicle 10 will leave the low emission zone LEZ. Accordingly, in the fourth embodiment according to the present disclosure, the desired amount of current QHTtgt is set to a smaller value when the distance D is large than when the distance D is small, as shown in FIG. 18. As a result, electricity is effectively used.

Figure 19:
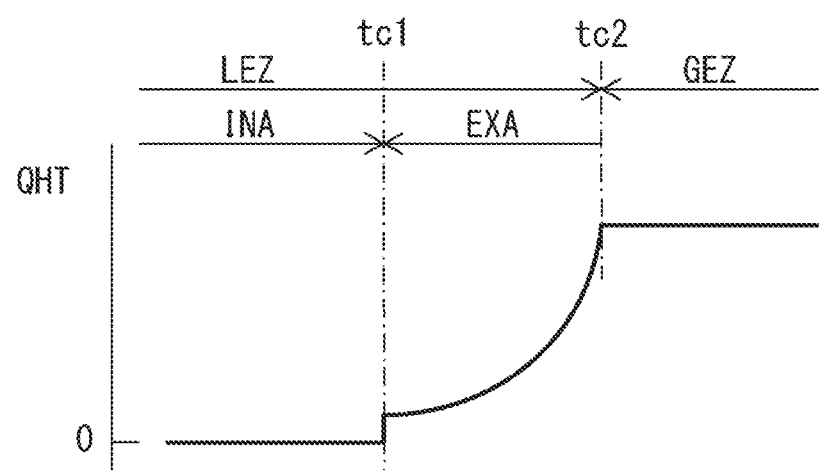
FIG. 19 is a timing chart illustrating the fourth embodiment according to the present disclosure.

In an example of FIG. 19, it is determined until time tc1 that the vehicle 10 is located in the inner area INA of the low emission zone LEZ. In this case, the electric heater 11f is turned off (amount of current QHT=0). When it is determined at time tc1 that the vehicle 10 has entered the exit area EXA, the electric heater 11f is turned on (QHT>0). In this case, the amount of current QHT increases as the distance D decreases. When it is subsequently determined at time tc2 that the vehicle 10 has left the low emission zone LEZ, the operating state of the electric heater 11f is maintained.

Figure 20:
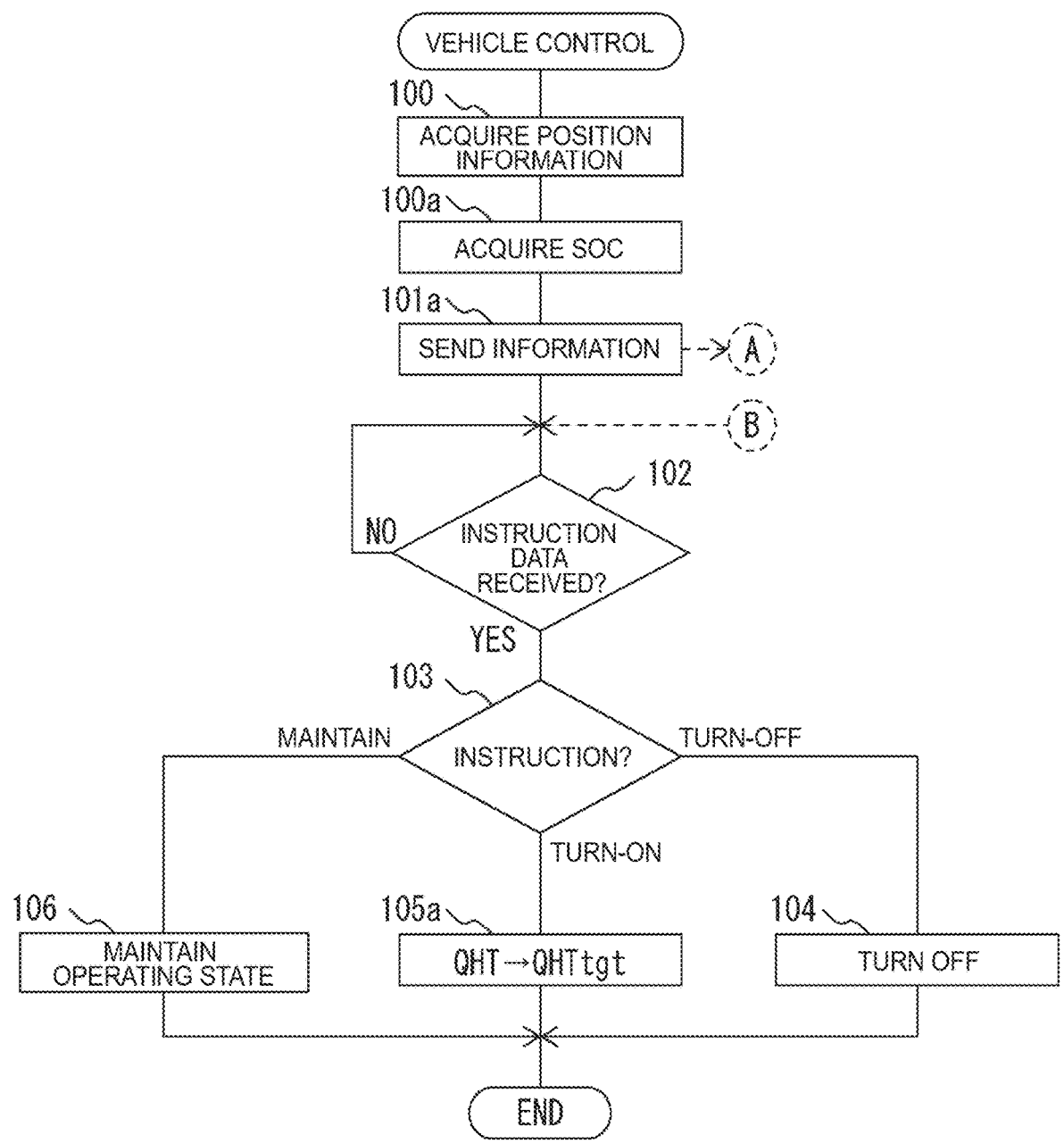
FIG. 20 is a flowchart of a vehicle control routine of the fourth embodiment according to the present disclosure.

FIG. 20 illustrates a routine for performing control in the vehicle 10 in the fourth embodiment according to the present disclosure. The routine of FIG. 20 is different from the routine of FIG. 12 in the following points. In the routine of FIG. 20, when the vehicle 10 receives instruction data including a turn-on instruction and a desired amount of current QHTtgt in step 103, the routine proceeds to step 105a, and the electric heater 11f is turned on so that that the amount of current QHT becomes equal to the desired amount of current QHTtgt.

Figure 21:
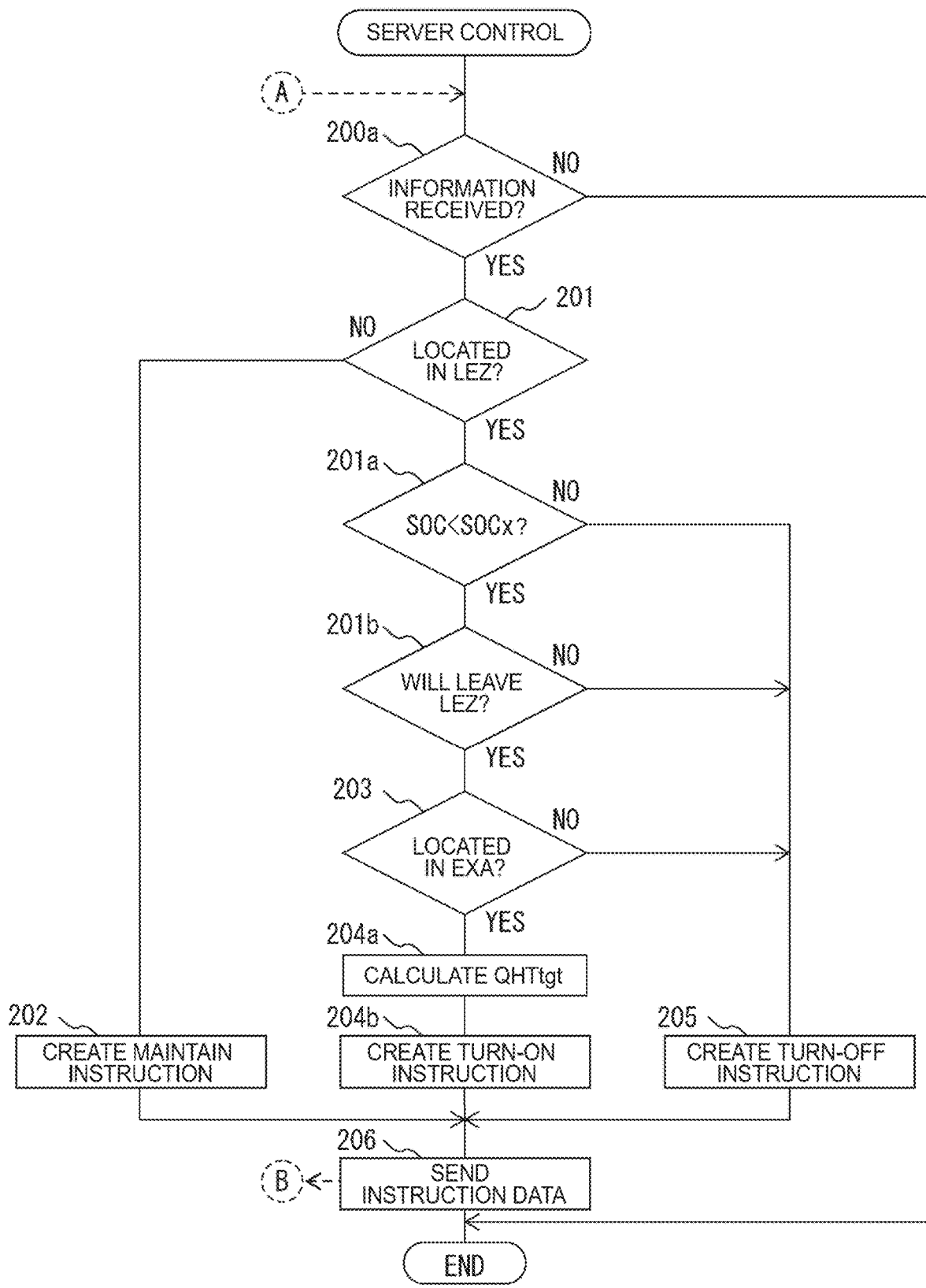
FIG. 21 is a flowchart of a server control routine of the fourth embodiment according to the present disclosure.

FIG. 21 illustrates a routine for performing control in the server 30 in the fourth embodiment according to the present disclosure. The routine of FIG. 21 is different from the routine of FIG. 16 in the following points. In the routine of FIG. 21, when it is determined in step 203 that the vehicle 10 is located in the exit area EXA, the routine proceeds to step 204a, and a desired amount of current QHTtgt is calculated. In the following step 204b, instruction data including a turn-on instruction and the desired amount of current QHTtgt is created. The routine then proceeds to step 206.

In the fourth embodiment according to the present disclosure, the amount-of-current determination unit 40c is provided in the server 30. In another embodiment, the amount-of-current determination unit 40c is provided in the vehicle 10, and the desired amount of current QHTtgt is calculated in the vehicle 10. In this case, the distance D is sent from the server 30 to the vehicle 10. Alternatively, the position information of the low emission zone LEZ (boundary GF) is sent from the server 30 to the vehicle 10, and the distance D is calculated in the vehicle 10.

Figure 22:
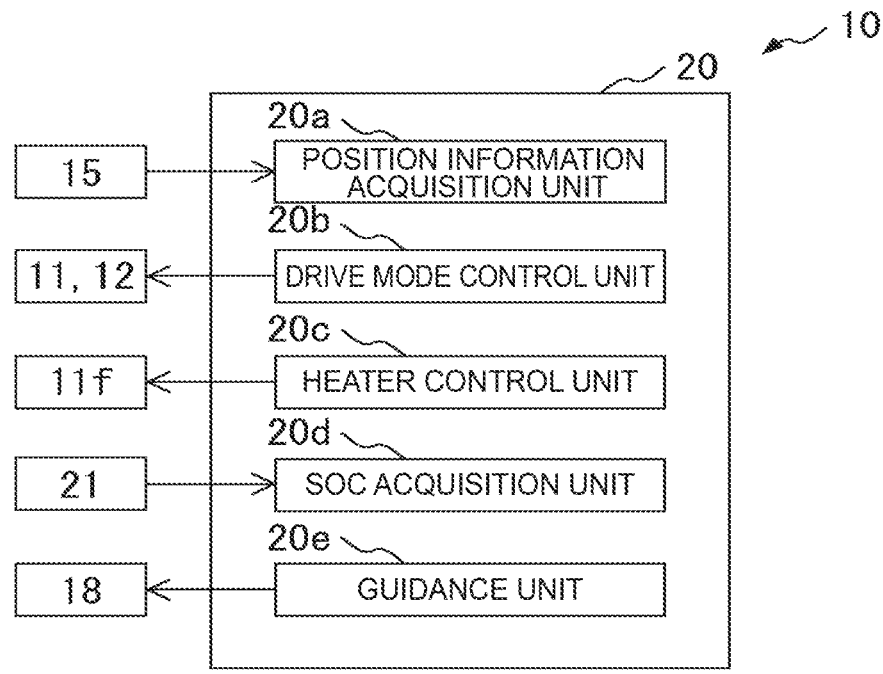
FIG. 22 is a functional block diagram of a vehicle in a fifth embodiment according to the present disclosure.

Next, a fifth embodiment according to the present disclosure will be described with reference to FIGS. 22 to 27. The fifth embodiment according to the present disclosure is different from the fourth embodiment according to the present disclosure in the following points. As shown in FIG. 22, the electronic control unit 20 of the vehicle 10 of the fifth embodiment according to the present disclosure further includes a guidance unit 20e. The guidance unit 20e controls the HMI 18 to present a new destination to the occupant of the vehicle 10 or to notify the occupant of the vehicle 10 of the new destination. The occupant of the vehicle 10 causes the vehicle 10 to head towards the destination, and the vehicle 10 is thus guided to the destination. In the case where the vehicle 10 is an autonomous vehicle, the vehicle 10 is caused to head towards the destination by the autonomous driving function of the vehicle 10, and the vehicle 10 is thus guided to the destination.

Figure 23:
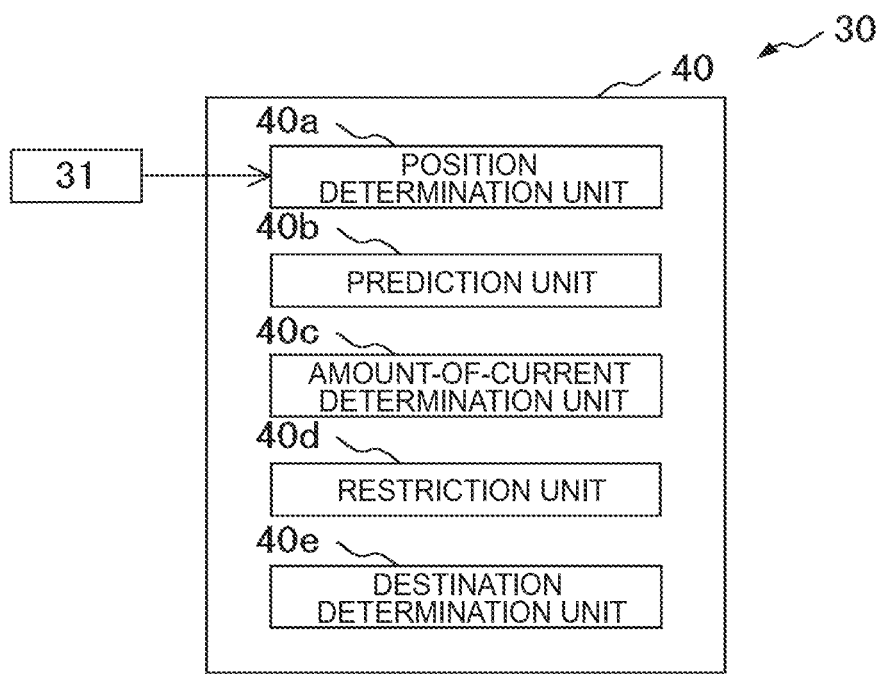
FIG. 23 is a functional block diagram of a server in the fifth embodiment according to the present disclosure.

In the fifth embodiment according to the present disclosure, as shown in FIG. 23, the electronic control unit 40 of the server 30 further includes a restriction unit 40d and a destination determination unit 40e. The restriction unit 40d restricts operation of the electric heater 11f according to an amount of available electrical energy QEavl that is determined according to the SOC of the battery 13 of the vehicle 10. The destination determination unit 40e determines a new destination of the vehicle 10 based on the amount of available electrical energy QEavl.

The amount of available electrical energy QEavl of the fifth embodiment according to the present disclosure is represented by an excess of a current SOC over the set SOC described above (current SOC-set SOC). As the drive mode is switched from the EV mode to the HV mode when the SOC becomes lower than the set SOC, the amount of available electrical energy QEavl of the fifth embodiment according to the present disclosure can be considered to be the amount of electrical energy that can be output from the battery 13 while maintaining the EV mode. In another example, the amount of available electrical energy QEavl is represented by an excess of a current SOC over a lower limit of the SOC. The lower limit is such an SOC that it is extremely difficult to restore the SOC once the SOC becomes lower than the lower limit.

If the electric heater 11f is turned on when the amount of available electrical energy QEavl is smaller than a required amount of electrical energy QEreq, there may not be enough electrical energy for the vehicle 10 to move within the low emission zone LEZ in the EV mode, and especially the vehicle 10 may not be able to leave the low emission zone LEZ in the EV mode. The required amount of electrical energy QEreq herein refers to the amount of electrical energy required for the vehicle 10 to leave the low emission zone LEZ in the EV mode with the catalyst 11e being active.

In the fifth embodiment according to the present disclosure, when it is determined that the vehicle 10 is located in the exit area EXA and that the amount of available electrical energy QEavl is smaller than the required amount of electrical energy QEreq, a smaller amount of current is applied to the electric heater 11f, namely operation of the electric heater 11f is restricted, as compared to when it is determined that the vehicle 10 is located in the exit area EXA and that the amount of available electrical energy QEavl is larger than the required amount of electrical energy QEreq. In one example, no current is applied to the electric heater 11f, so that the electric heater 11f is turned off. This ensures enough electrical energy for the vehicle 10 to travel within the low emission zone LEZ in the EV mode.

Figure 24:
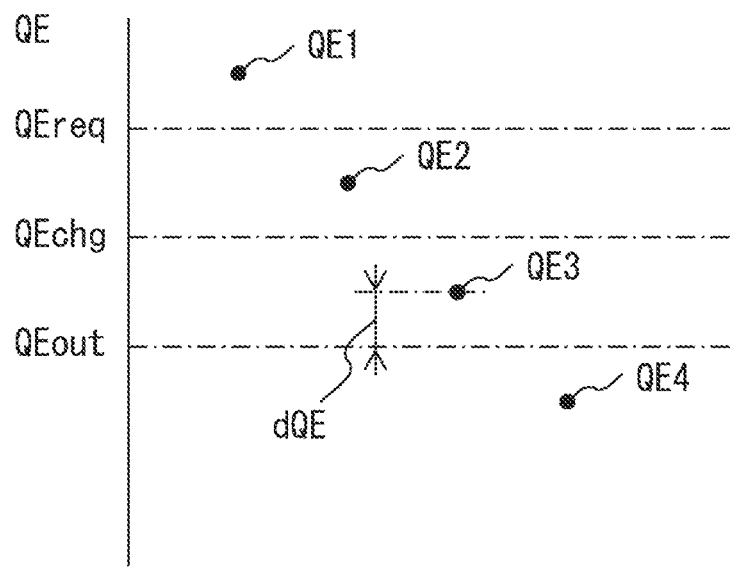
FIG. 24 is a graph illustrating the fifth embodiment according to the present disclosure.
Figure 25:
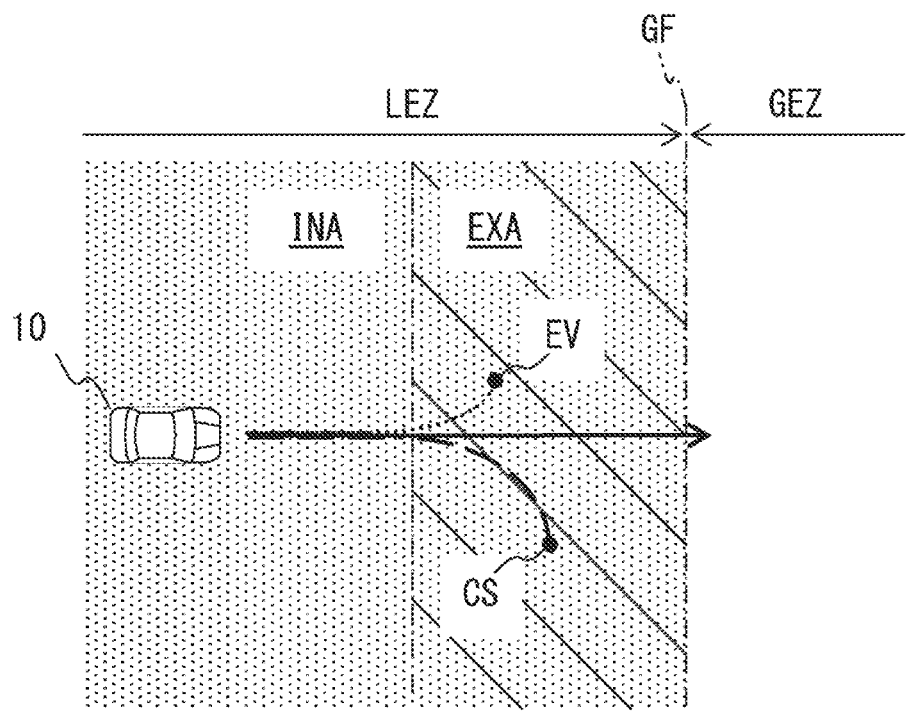
FIG. 25 schematically illustrates the fifth embodiment according to the present disclosure.

Specifically, when the amount of available electrical energy QEavl is larger than the required amount of electrical energy QEreq as shown by QE1 in FIG. 24, the electric heater 11f is turned on as in the fourth embodiment according to the present disclosure.

On the other hand, when the amount of available electrical energy QEavl is smaller than the required amount of electrical energy QEreq as shown by QE2, QE3, and QE4 in FIG. 24, the restriction unit 40d creates data including a turn-off instruction and sends the data to the vehicle 10. As a result, the electric heater 11f is turned off.

When the amount of available electrical energy QEavl is smaller than the required amount of electrical energy QEreq (QE2, QE3, and QE4), the destination determination unit 40e of the fifth embodiment according to the present disclosure determines a new destination according to the amount of available electrical energy QEavl, creates data about the new destination (including the position of the new destination, a route from the current position to the new destination, etc.), and sends the data together with the turn-off instruction to the vehicle 10. When the guidance unit 20e of the vehicle 10 receives the new destination, the guidance unit 20e notifies the occupant of the vehicle 10 of the new destination via the HMI 18.

In the fifth embodiment according to the present disclosure, an amount of charging required electrical energy QEchg is first calculated. The amount of charging required electrical energy QEchg is the amount of electrical energy required for the vehicle 10 to reach a charging station within the low emission zone LEZ in the EV mode without turning on the electric heater 11f. The amount of charging required electrical energy QEchg is calculated based on, e.g., the distance from the current position of the vehicle 10 to the charging station, electrical energy consumption per unit traveled distance of the vehicle 10, etc. When it is then determined that the amount of available electrical energy QEavl is larger than the amount of charging required electrical energy QEchg as shown by QE2 in FIG. 24, the charging station is set as a new destination. As a result, the vehicle 10 is guided to the charging station CS as shown by a dashed line in FIG. 25. The vehicle 10 is thus externally charged at the charging station CS, so that the vehicle 10 can leave the low emission zone LEZ in the EV mode. For example, the charging station CS is a charging station for which the amount of charging required electrical energy QEchg is smallest.

In the fifth embodiment according to the present disclosure, an amount of out-of-zone required electrical energy QEout is first calculated. The amount of out-of-zone required electrical energy QEout is the amount of electrical energy required for the vehicle 10 to leave the low emission zone LEZ in the EV mode without turning on the electric heater 11f. The amount of out-of-zone required electrical energy QEout is calculated based on, e.g., the distance from the current position of the vehicle 10 to the boundary GF or the general zone GEZ, electrical energy consumption per unit traveled distance of the vehicle 10, etc. When it is then determined that the amount of available electrical energy QEavl is larger than the amount of out-of-zone required electrical energy QEout as shown by QE3 in FIG. 24, outside the low emission zone LEZ is set as a new destination. As a result, the vehicle 10 is guided out of the low emission zone LEZ as shown by a continuous line in FIG. 25. This eliminates the need to switch the drive mode to the HV mode within the low emission zone LEZ, namely the need to operate the internal combustion engine 11 within the low emission zone LEZ. In the fifth embodiment according to the present disclosure, the internal combustion engine 11 is allowed to start even when the catalyst 11e is inactive. Accordingly, enough electrical energy required for the vehicle 10 to travel is ensured by switching the drive mode to the HV mode outside the low emission zone LEZ. In this case, a route out of the low emission zone LEZ is selected so as to minimize the amount of out-of-zone required electrical energy QEout. Moreover, in this case, there are cases where the catalyst 11e cannot be activated by the electric heater 11f when the internal combustion engine 11 should be started. In such cases, a malfunction indicator light (MIL) is turned on.

In the example shown in FIG. 24, the amount of charging required electrical energy QEchg is larger than the amount of out-of-zone required electrical energy QEout. However, there are cases where the amount of out-of-zone required electrical energy QEout is larger than the amount of charging required electrical energy QEchg. In any case, in the fifth embodiment according to the present disclosure, whether the amount of available electrical energy QEavl is larger than the amount of charging required electrical energy QEchg is determined before determining whether the amount of available electrical energy QEavl is larger than the amount of out-of-zone required electrical energy QEout. This reduces the risk that the internal combustion engine 11 may be operated with the catalyst 11e being inactive.

Moreover, in the fifth embodiment according to the present disclosure, when it is determined that the amount of available electrical energy QEavl is smaller than the amount of out-of-zone required electrical energy QEout as shown by QE4 in FIG. 24, an evacuation position EV is set as a new destination. The evacuation position EV is a position within the low emission zone LEZ where the vehicle 10 can be safely stopped. As a result, the vehicle 10 is guided to the evacuation position EV as shown by a dotted line in FIG. 25. Accordingly, operation of the internal combustion engine 11 within the low emission zone LEZ is restricted. In the fifth embodiment according to the present disclosure, in this case, the occupant of the vehicle 10 is notified via, e.g., the HMI 18 that the vehicle 10 cannot leave the low emission zone LEZ in the EV mode.

Figure 26:
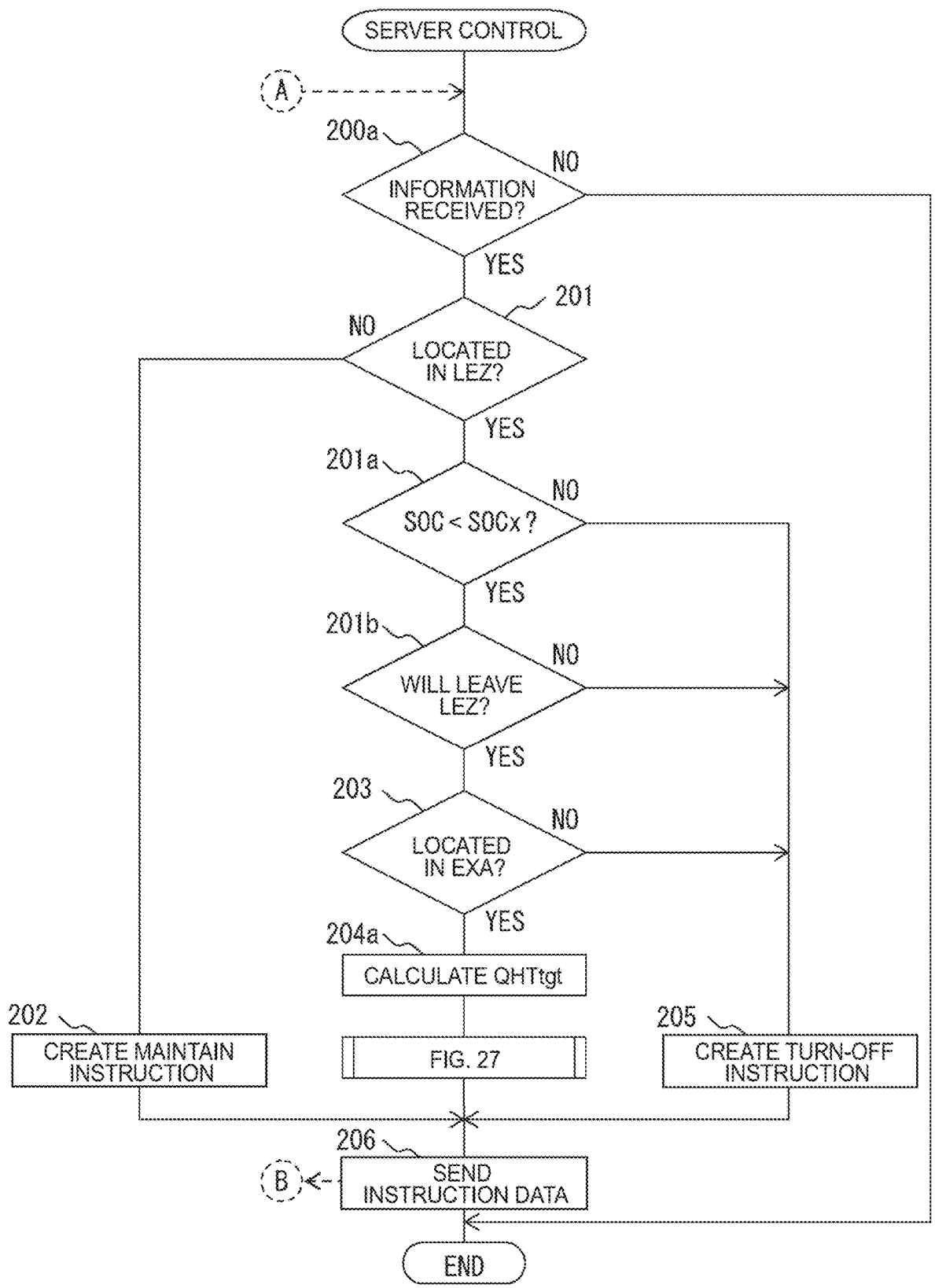
FIG. 26 is a flowchart of a server control routine of the fifth embodiment according to the present disclosure.
Figure 27:
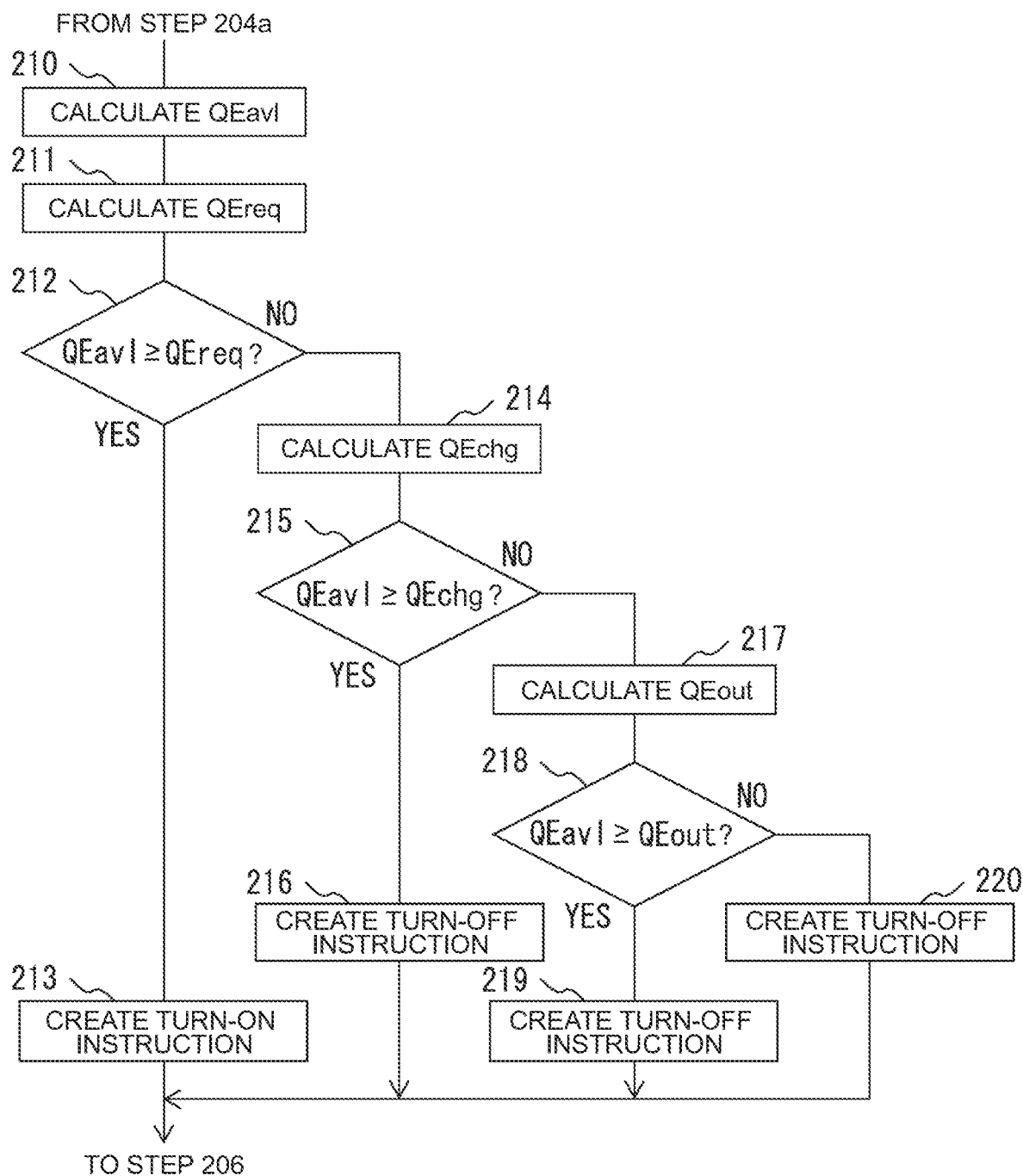
FIG. 27 is a flowchart of the server control routine of the fifth embodiment according to the present disclosure.

FIGS. 26 and 27 illustrate a routine for performing control in the server 30 in the fifth embodiment according to the present disclosure. The differences from the routine shown in FIG. 21 will be described. The routine shown in FIGS. 26 and 27 proceeds from step 204a to step 210 in FIG. 27, and the amount of available electrical energy QEavl is calculated. In the following step 211, the required amount of electrical energy QEreq is calculated. In the subsequent step 212, it is determined whether the amount of available electrical energy QEavl is equal to or larger than the required amount of electrical energy QEreq. When QEavl QEreq, the routine proceeds to step 213, and instruction data including a turn-on instruction and the desired amount of current QHTtgt is created as in step 204b. The routine then proceeds to step 206.

When QEavl<QEreq, the routine proceeds from step 212 to step 214, and the amount of charging required electrical energy QEchg is calculated. In the following step 215, it is determined whether the amount of available electrical energy QEavl is equal to or larger than the amount of charging required electrical energy QEchg. When QEavl QEchg, the routine proceeds to step 216, and instruction data including a turn-off instruction and data about the charging station CS as a new destination is created. The routine then proceeds to step 206.

When QEavl<QEchg, the routine proceeds from step 215 to step 217, and the amount of out-of-zone required electrical energy QEout is calculated. In the following step 218, it is determined whether the amount of available electrical energy QEavl is equal to or larger than the amount of out-of-zone required electrical energy QEout. When QEavl QEout, the routine proceeds to step 219, and instruction data including a turn-off instruction and data about outside the low emission zone LEZ as a new destination is created. The routine then proceeds to step 206.

When QEavl<QEout, the routine proceeds from step 218 to step 220, and instruction data including a turn-off instruction and data about the evacuation position EV within the low emission zone LEZ as a new destination is created. The routine then proceeds to step 206.

In the fifth embodiment according to the present disclosure, when QEchg>QEavl≥QEout, the electric heater 11f is turned off and the vehicle 10 is guided out of the low emission zone LEZ. In another example, the electric heater 11f is turned on and the vehicle 10 is guided out of the low emission zone LEZ. In this case, the amount of electrical energy that can be supplied to the electric heater 11f is represented by the difference between the amount of available electrical energy QE3 and the amount of out-of-zone required electrical energy QEout as shown by dQE in FIG. 24. As a result, the temperature of the catalyst 11e is raised even though the catalyst 11e is not activated. Accordingly, the catalyst 11e will be quickly activated when the internal combustion engine 11 is operated subsequently.

In the fifth embodiment according to the present disclosure, the restriction unit 40d is provided in the server 30. In another embodiment, the restriction unit 40d is provided in the vehicle 10, and the vehicle 10 determines whether operation of the electric heater 11f should be restricted. In the fifth embodiment according to the present disclosure, the destination determination unit 40e is provided in the server 30. In another embodiment, the destination determination unit 40e is provided in the vehicle 10, and the vehicle 10 determines a new destination.

In the fifth embodiment according to the present disclosure, when it is determined that the amount of available electrical energy QEavl is smaller than the amount of charging required electrical energy QEchg, the vehicle 10 may not be able to leave the low emission zone LEZ (QEavl<QEout). Alternatively, even if the vehicle 10 can leave the low emission zone LEZ, the catalyst 11e may not be active (QEavl<QEout).

Accordingly, in the fifth embodiment according to the present disclosure, a control to increase the amount of available electrical energy QEavl is performed when QEavl<QEchg. In one example, the amount of electrical energy that is consumed by the vehicle 10 is limited as much as possible. For example, electrical energy consumption for purposes other than traveling of the vehicle 10, such as an air conditioning system and an infotainment system, is reduced or eliminated. In another example, the air resistance of the vehicle 10 is reduced by, e.g., closing windows of the vehicle 10. In still another example, the frequency or amount of acceleration and deceleration of the vehicle 10 is limited by reducing accelerator sensitivity. This increases the distance the vehicle 10 can travel.

In the above various embodiments according to the present disclosure, the server 30 determines whether the vehicle 10 is located in the low emission zone LEZ. In a further embodiment (not shown), the electronic control unit 20 of the vehicle 10 includes a position determination unit, and the vehicle 10 determines whether the vehicle 10 is located in the low emission zone LEZ. In this case, in one example, the position information of the low emission zones LEZs is stored in the vehicle 10. In another example, the position information of the low emission zones LEZs is stored in the server 30, and the vehicle 10 receives the position information of the low emission zone LEZ from the server 30 and determines whether the vehicle 10 is located in the low emission zone LEZ.

In a still further embodiment (not shown), the various controls included in the above embodiments according to the present disclosure are performed individually or in combination.

What is claimed is:

1. A control system for a hybrid vehicle, comprising:
an electric heater configured to heat a catalyst of an internal combustion engine;
a position determination unit configured to determine whether the hybrid vehicle is located in an exit area of a low emission zone where operation of the internal combustion engine is supposed to be restricted, the exit area being an area adjacent to a boundary of the low emission zone; and
a heater control unit configured to turn on the electric heater when the position determination unit determines that the hybrid vehicle is located in the exit area, wherein:

the hybrid vehicle includes the internal combustion engine and an electric motor;

a drive mode of the hybrid vehicle is switched between an electric vehicle mode and a hybrid vehicle mode, the electric vehicle mode being a mode in which the internal combustion engine is stopped and the electric motor is operated, and the hybrid vehicle mode being a mode in which the internal combustion engine and the electric motor are operated; and the heater control unit is configured to apply a smaller amount of current to the electric heater per unit time when a distance from the hybrid vehicle to the boundary is larger than when the distance is small in a case where the position determination unit determines that the hybrid vehicle is located in the exit area.

2. The control system according to claim 1, wherein the heater control unit is configured to turn on the electric heater in such a way that the catalyst is active when the hybrid vehicle leaves the low emission zone.

3. The control system according to claim 2, wherein the heater control unit is configured to apply a smaller amount of current to the electric heater when determination is made that an amount of available electrical energy is smaller than a required amount of electrical energy than when determination is made that the amount of available electrical energy is larger than the required amount of electrical energy in a case where the position determination unit determines that the hybrid vehicle is located in the exit area, the amount of available electrical energy being an amount of electrical energy determined according to a state of charge of a battery of the hybrid vehicle, and the required amount of electrical energy being an amount of electrical energy required for the hybrid vehicle to leave the low emission zone in the electric vehicle mode with the catalyst being active.

4. The control system according to claim 3, wherein the heater control unit is configured to apply no current to the electric heater so as not to turn on the electric heater when determination is made that the amount of available electrical energy is smaller than the required amount of electrical energy.

5. The control system according to claim 3, wherein the heater control unit is configured to supply a part or all of an excess of the amount of available electrical energy over an amount of out-of-zone required electrical energy to the electric heater when determination is made that the amount of available electrical energy is smaller than the required amount of electrical energy and larger than the amount of out-of-zone required electrical energy, the amount of out-of-zone required electrical energy being an amount of electrical energy required for the hybrid vehicle to leave the low emission zone in the electric vehicle mode without turning on the electric heater.

6. The control system according to claim 3, further comprising a guidance unit configured to guide the hybrid vehicle to a charging station within the low emission zone when determination is made that the amount of available electrical energy is smaller than the required amount of electrical energy and larger than an amount of charging required electrical energy, the amount of charging required electrical energy being an amount of electrical energy required for the hybrid vehicle to reach the charging station within the low emission zone in the electric vehicle mode without turning on the electric heater.

7. The control system according to claim 3, further comprising a guidance unit configured to guide the hybrid vehicle out of the low emission zone when determination is made that the amount of available electrical energy is smaller than the required amount of electrical energy and larger than an amount of out-of-zone required electrical energy, the amount of out-of-zone required electrical energy being an amount of electrical energy required for the hybrid vehicle to leave the low emission zone in the electric vehicle mode without turning on the electric heater.

8. The control system according to claim 6, wherein the guidance unit is configured to guide the hybrid vehicle out of the low emission zone.

9. A control system for a hybrid vehicle, comprising:

an electric heater configured to heat a catalyst of an internal combustion engine;

a position determination unit configured to determine whether the hybrid vehicle is located in an exit area of a low emission zone where operation of the internal combustion engine is supposed to be restricted, the exit area being an area adjacent to a boundary of the low emission zone; and a heater control unit configured to turn on the electric heater when the position determination unit determines that the hybrid vehicle is located in the exit area, wherein:

the hybrid vehicle includes the internal combustion engine and an electric motor;

a drive mode of the hybrid vehicle is switched between an electric vehicle mode and a hybrid vehicle mode, the electric vehicle mode being a mode in which the internal combustion engine is stopped and the electric motor is operated, and the hybrid vehicle mode being a mode in which the internal combustion engine and the electric motor are operated;

the heater control unit is configured to turn on the electric heater in such a way that the catalyst is active when the hybrid vehicle leaves the low emission zone; and the heater control unit is configured to apply a smaller amount of current to the electric heater when determination is made that an amount of available electrical energy is smaller than a required amount of electrical energy than when determination is made that the amount of available electrical energy is larger than the required amount of electrical energy in a case where the position determination unit determines that the hybrid vehicle is located in the exit area, the amount of available electrical energy being an amount of electrical energy determined according to a state of charge of a battery of the hybrid vehicle, and the required amount of electrical energy being an amount of electrical energy required for the hybrid vehicle to leave the low emission zone in the electric vehicle mode with the catalyst being active.

10. The control system according to claim 9, wherein the heater control unit is configured to apply no current to the electric heater so as not to turn on the electric heater when determination is made that the amount of available electrical energy is smaller than the required amount of electrical energy.

11. The control system according to claim 9, wherein the heater control unit is configured to supply a part or all of an excess of the amount of available electrical energy over an amount of out-of-zone required electrical energy to the electric heater when determination is made that the amount of available electrical energy is smaller than the required amount of electrical energy and larger than the amount of out-of-zone required electrical energy, the amount of out-of-zone required electrical energy being an amount of electrical energy required for the hybrid vehicle to leave the low emission zone in the electric vehicle mode without turning on the electric heater.

12. The control system according to claim 9, further comprising a guidance unit configured to guide the hybrid vehicle to a charging station within the low emission zone when determination is made that the amount of available electrical energy is smaller than the required amount of electrical energy and larger than an amount of charging required electrical energy, the amount of charging required electrical energy being an amount of electrical energy required for the hybrid vehicle to reach the charging station within the low emission zone in the electric vehicle mode without turning on the electric heater.

13. The control system according to claim 9, further comprising a guidance unit configured to guide the hybrid vehicle out of the low emission zone when determination is made that the amount of available electrical energy is smaller than the required amount of electrical energy and larger than an amount of out-of-zone required electrical energy, the amount of out-of-zone required electrical energy being an amount of electrical energy required for the hybrid vehicle to leave the low emission zone in the electric vehicle mode without turning on the electric heater.

14. The control system according to claim 12, wherein the guidance unit is configured to guide the hybrid vehicle out of the low emission zone.

\* \* \* \* \*